(12) United States Patent
Gibson

(10) Patent No.: US 10,890,006 B1
(45) Date of Patent: Jan. 12, 2021

(54) METHOD AND APPARATUS FOR MATCHING POOL STEP PATTERNS WITH LINER PATTERNS

(71) Applicant: Michael Gibson, Brookhaven, GA (US)

(72) Inventor: Michael Gibson, Brookhaven, GA (US)

( * ) Notice: Subject to any disclaimer, the term of this patent is extended or adjusted under 35 U.S.C. 154(b) by 0 days.

(21) Appl. No.: 16/593,353

(22) Filed: Oct. 4, 2019

(51) Int. Cl.
*E02D 27/00* (2006.01)
*E04H 4/14* (2006.01)
*B29C 51/10* (2006.01)
*B29B 11/06* (2006.01)
*B29L 31/52* (2006.01)

(52) U.S. Cl.
CPC .............. *E04H 4/144* (2013.01); *B29B 11/06* (2013.01); *B29C 51/10* (2013.01); *B29C 2795/002* (2013.01); *B29L 2031/5254* (2013.01); *E04H 2004/146* (2013.01)

(58) Field of Classification Search
None
See application file for complete search history.

(56) References Cited

U.S. PATENT DOCUMENTS

| | | | | |
|---|---|---|---|---|
| 3,478,370 A | * | 11/1969 | Purpuri | E04H 4/144 52/188 |
| 3,952,338 A | * | 4/1976 | Troxclair | E04H 4/14 4/492 |
| 5,400,556 A | * | 3/1995 | Favaron | B29C 51/12 182/228.2 |
| 2009/0056257 A1 | * | 3/2009 | Mollinger | B29C 41/04 52/314 |
| 2009/0062431 A1 | * | 3/2009 | Nasr | E04F 13/185 524/8 |
| 2014/0069742 A1 | * | 3/2014 | Lipniarski | E04H 4/144 182/194 |
| 2019/0169870 A1 | * | 6/2019 | Khamis | E04H 4/0018 |

* cited by examiner

*Primary Examiner* — Basil S Katcheves
(74) *Attorney, Agent, or Firm* — Sand, Sebolt & Wernow Co., LPA

(57) ABSTRACT

A molded pool step, a method of fabricating the pool step and a method of matching a decorative pattern on the pool step to the decorative pattern on a pool liner is disclosed. The pool step is fabricated by applying a decorative pattern to one surface of a transparent sheet of moldable material; positioning the sheet of material on a pool step mold such that the sheet contacts a molding surface of the pool step mold; molding the sheet of material on the pool step mold such that the decorative pattern is located a distance inwardly from an outer surface of the pool step and is thereby prevented being contacted by pool water or people using the pool. When the pool step is molded and installed the decorative pattern on the three-dimension pool step is substantially continuous with the decorative pattern on the liner adjacent the pool step.

15 Claims, 20 Drawing Sheets

US 10,890,006 B1

METHOD AND APPARATUS FOR MATCHING POOL STEP PATTERNS WITH LINER PATTERNS

TECHNICAL FIELD

The present disclosure is directed to the construction of swimming pools that include a vinyl liner. More particularly, the present disclosure relates to the construction of stairs for such swimming pools. Specifically, the disclosure related to the method and apparatus for fabricating a molded pool step that includes a decorative pattern thereon that substantially matches a decorative pattern on vinyl liner installed over the rest of the swimming pool.

BACKGROUND

Background Information

One of the issues experienced in the construction of swimming pools that include vinyl liners is that it is quite difficult to get the pattern on the portion of the liner that covers the stairs to look the same as the pattern on the liner covering the rest of the pool. Because the stairs include treads and risers and other variously angled regions, covering them with the liner used on the rest of the pool can end up with the stairs looking substantially different to the rest of the pool. In many instances, the patterned liner on the stairs is aesthetically displeasing. It is therefore not uncommon to utilize a solid color liner on the stairs instead of using the same patterned liner used for the rest of the pool. The solid color liners can look mismatched with the rest of the liner.

SUMMARY

The method and apparatus disclosed herein addresses the shortcomings of the prior art in that the stairs are fabricated in such a way that the pattern thereon is identical to the pattern utilized in the rest of the pool. The method includes fabricating stairs out of a transparent material and then imprinting the desired pattern thereon using distortion printing and thereby creating an image that matches the rest of the liner.

A molded pool step, a method of fabricating the pool step, and a method of matching a decorative pattern on the pool step to the decorative pattern on a pool liner is disclosed herein. The pool step is fabricated by applying a decorative pattern to one surface of a transparent sheet of moldable material; positioning the sheet of material on a pool step mold such that the sheet contacts a molding surface of the pool step mold; molding the sheet of material on the pool step mold such that the decorative pattern is located a distance inwardly from an outer surface of the pool step and is thereby prevented being contacted by pool water or people using the pool. When the pool step is molded and installed the decorative pattern on the three-dimension pool step is substantially continuous with the decorative pattern on the liner adjacent the pool step.

In one aspect, an exemplary embodiment of the present disclosure may provide a method of fabricating a pool step comprising applying a decorative pattern to one surface of a transparent sheet of moldable material; molding the transparent sheet of moldable material into a pool step; positioning the decorative pattern a distance inwardly from an outer surface of the pool step; and preventing direct contact with the decorative pattern with a thickness of the transparent sheet of moldable material.

In another aspect, an exemplary embodiment of the present disclosure may provide a patterned pool step for a swimming pool comprising a molded step that includes an outer layer that is substantially entirely transparent, wherein the outer layer includes an exterior surface and an opposed interior surface; and wherein at least a portion of the exterior surface is one of contacted by pool water and used to exit or enter the swimming pool; and a decorative pattern applied on the interior surface of the outer layer, wherein the decorative pattern is spaced a distance inwardly from the exterior surface and is visible through the exterior surface.

In another aspect, and exemplary embodiment of the present disclosure may provide a method of matching a pattern on a pool step with a pattern on a pool liner comprising selecting a decorative pattern for a pool liner from a group of decorative patterns; selecting a pool liner for installation into a swimming pool, wherein the pool liner has the decorative pattern thereon; selecting a sheet of moldable material having an outside surface and an inside surface; wherein the sheet of moldable material is transparent; applying the selected decorative pattern to the inside surface of the sheet of moldable material; placing the sheet of moldable material on a pool step mold; molding the sheet of moldable material with the pool step mold into a pool step; installing the pool step into a swimming pool such that the decorative pattern is spaced a distance inwardly from the outside surface and is visible through the outside surface; and installing the pool liner adjacent the pool step.

In another aspect, an exemplary embodiment of the disclosure may provide a lined swimming pool comprising a pool bottom and pool sidewalls extending upwardly from the pool bottom; a molded pool step installed on one of the pool sidewalls; said molded pool step having a transparent outer layer with an exterior surface that is used for entering and exiting water in the swimming pool; and a decorative pattern provided an interior surface of the transparent outer layer; wherein the decorative pattern is visible through the exterior surface.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
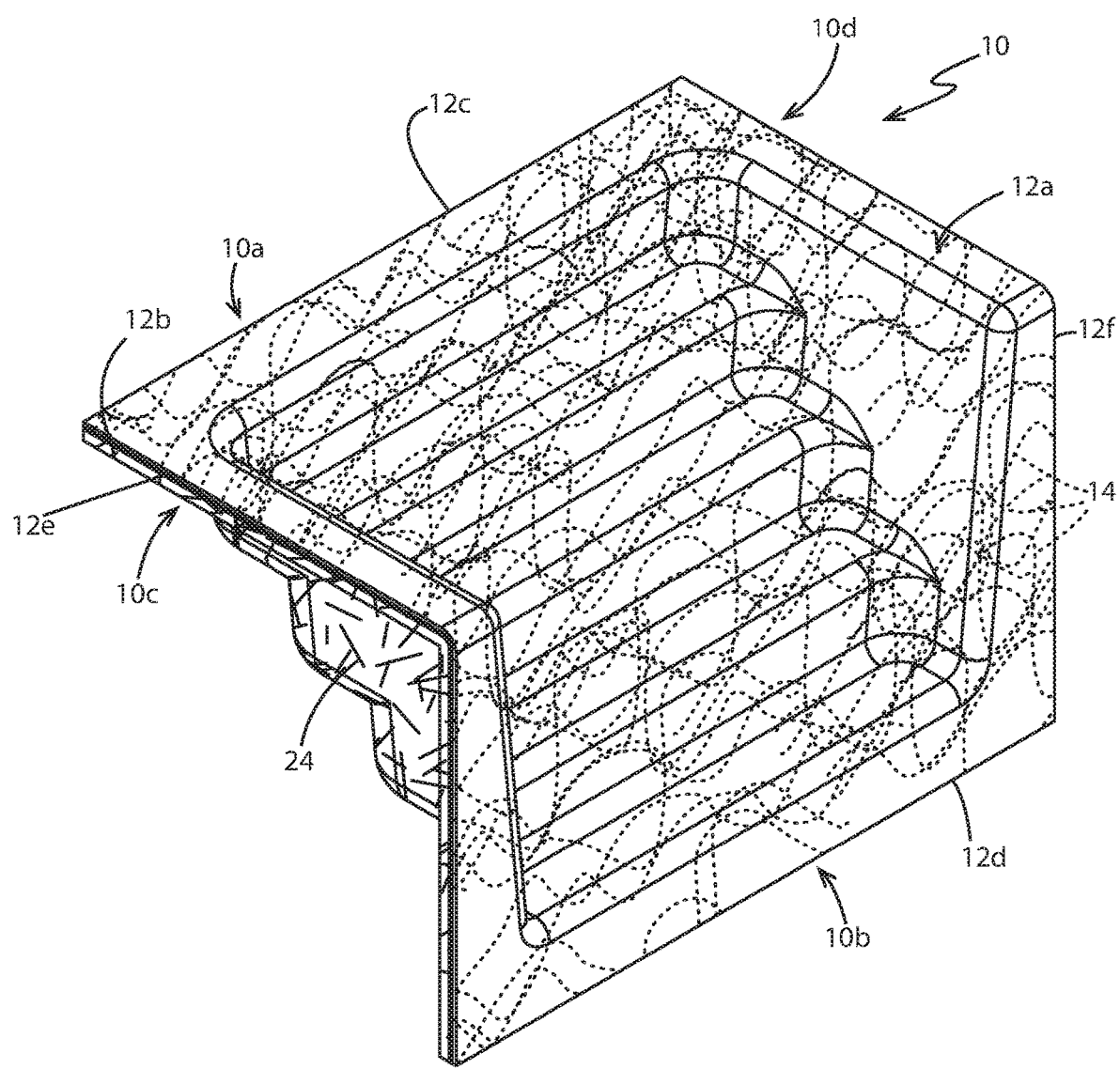
FIG. 1 is a top front perspective view of a molded and patterned pool step in accordance with an aspect of the present disclosure.

Referring to FIGS. 1-14 there is shown a method of producing a pool step and a pool step produced by the method. FIG. 1 shows the completed pool step, generally indicated by the reference number 10. The method of production comprises a number of steps that are described particularly with reference to FIGS. 2 through 11.

FIG. 1 shows a sheet 12 of material that is used to fabricate pool step 10. Sheet 12 is sheet of acrylic that is pulled and cut to a desired size. Sheet 12 has a front surface 12a and a back surface 12b, a top edge 12c, a bottom edge 12d, a left side edge 12e, and a right side edge 12f. Sheet 12 is a transparent or clear acrylic material from top edge 12c to bottom edge 12d and from left side edge 12e to right side edge 12f.

A suitable acrylic material for use as sheet 12 is a sheet of clear DR acrylic. DR acrylic is an impact modified thermoplastic acrylic.

Figure 2:
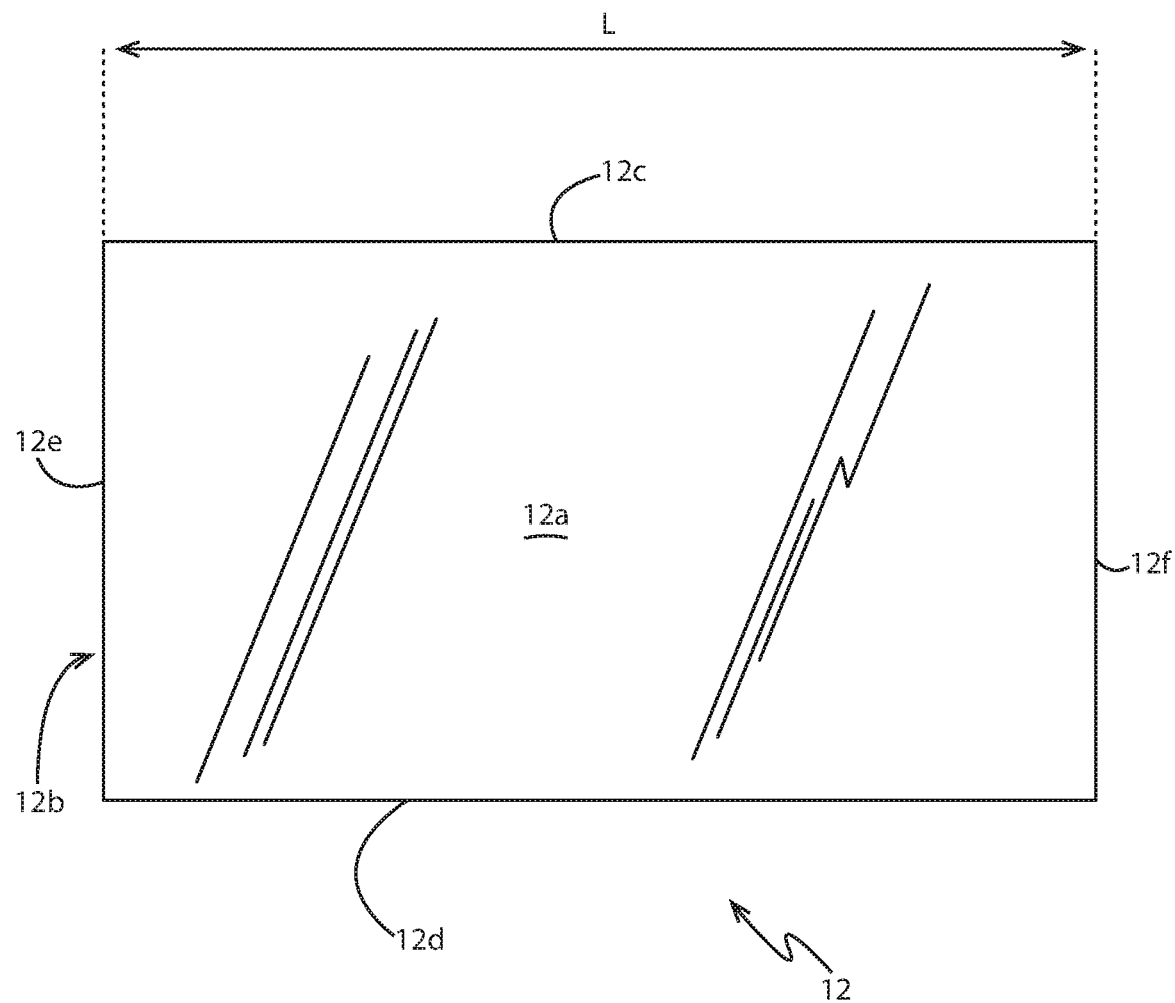
FIG. 2 is a top front perspective view of a transparent sheet of acrylic prior to printing a decorative pattern thereon
Figure 3:
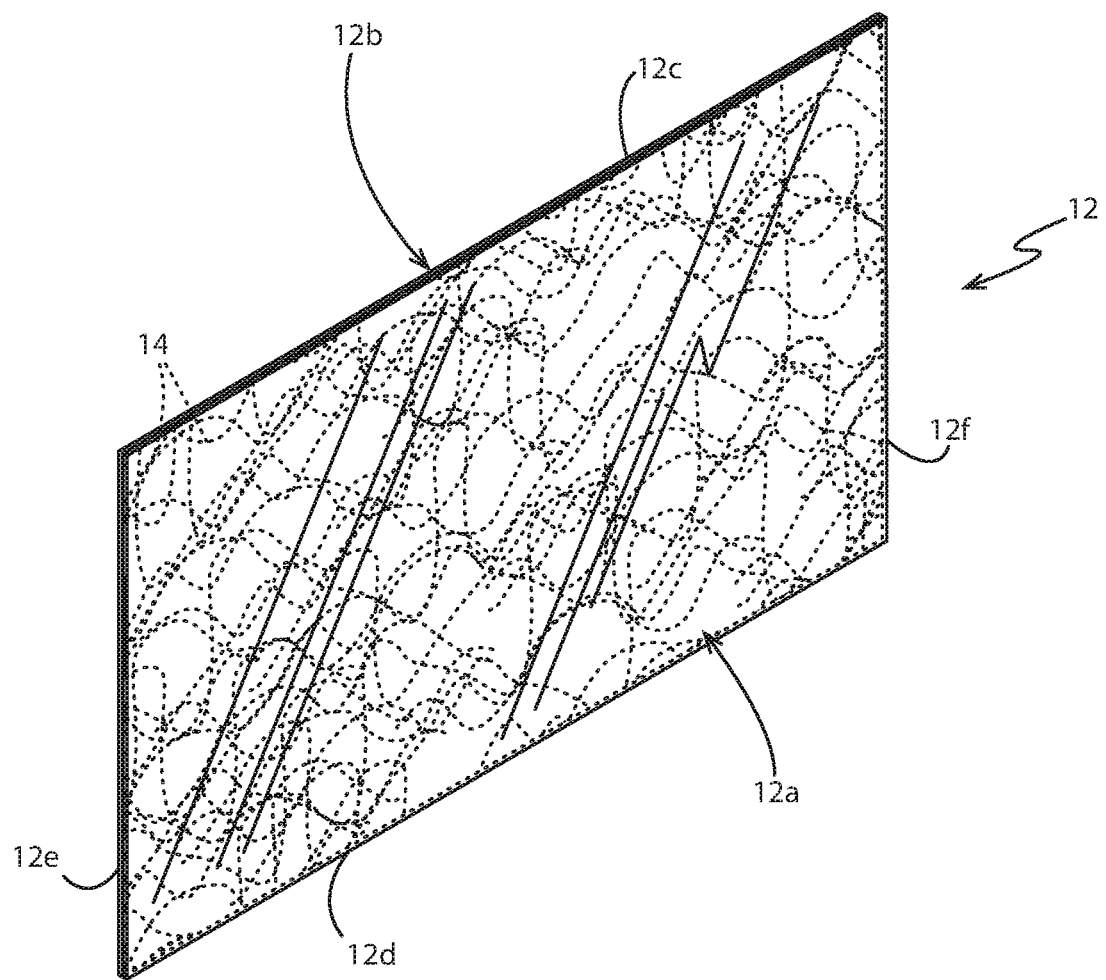
FIG. 3 is a top front perspective view of the sheet of acrylic after printing of a decorative pattern on a back surface thereof.
Figure 4:
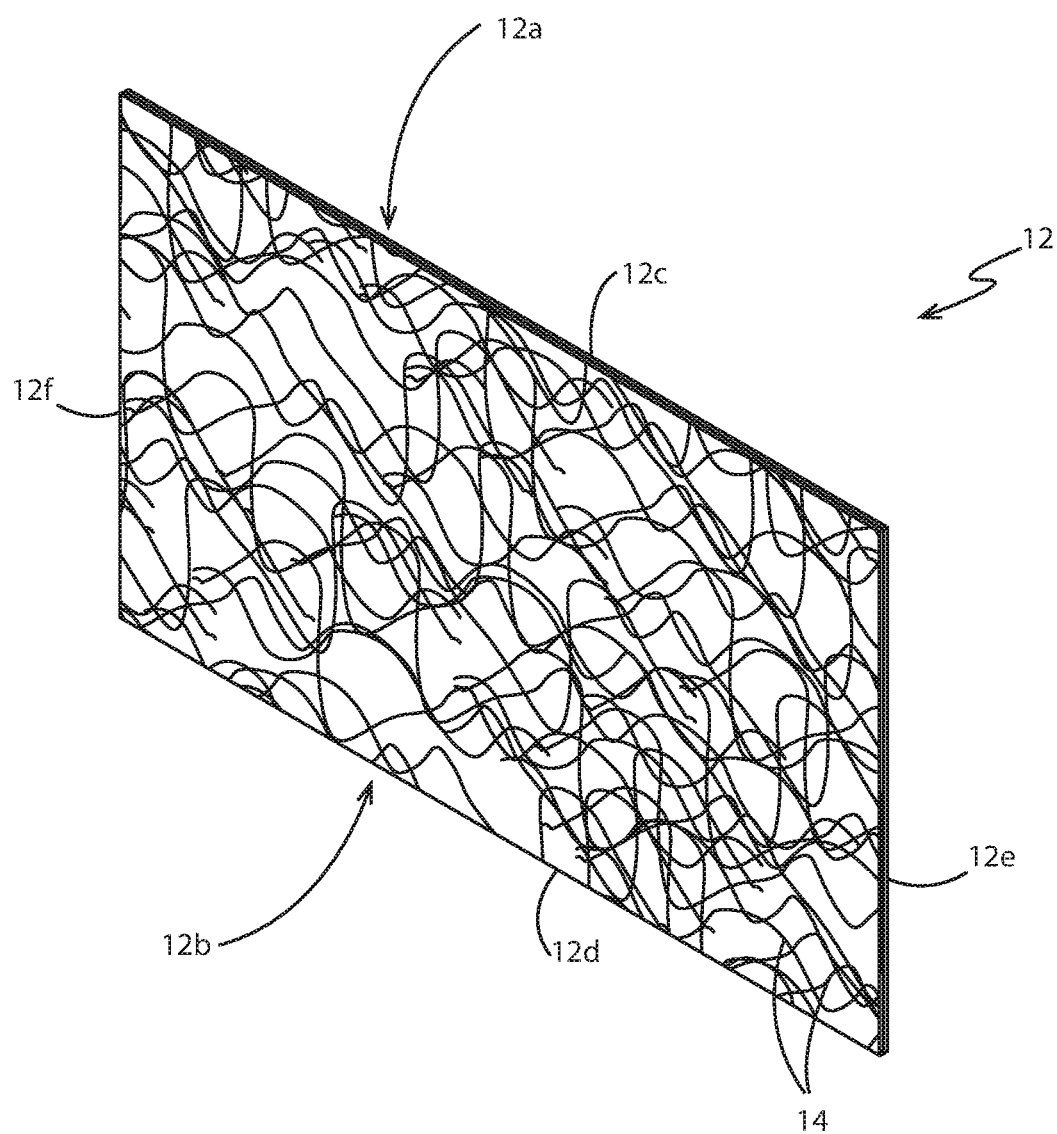
FIG. 4 is a top rear perspective view of the sheet of acrylic after printing of the decorative pattern on the back surface thereof.
Figure 5:
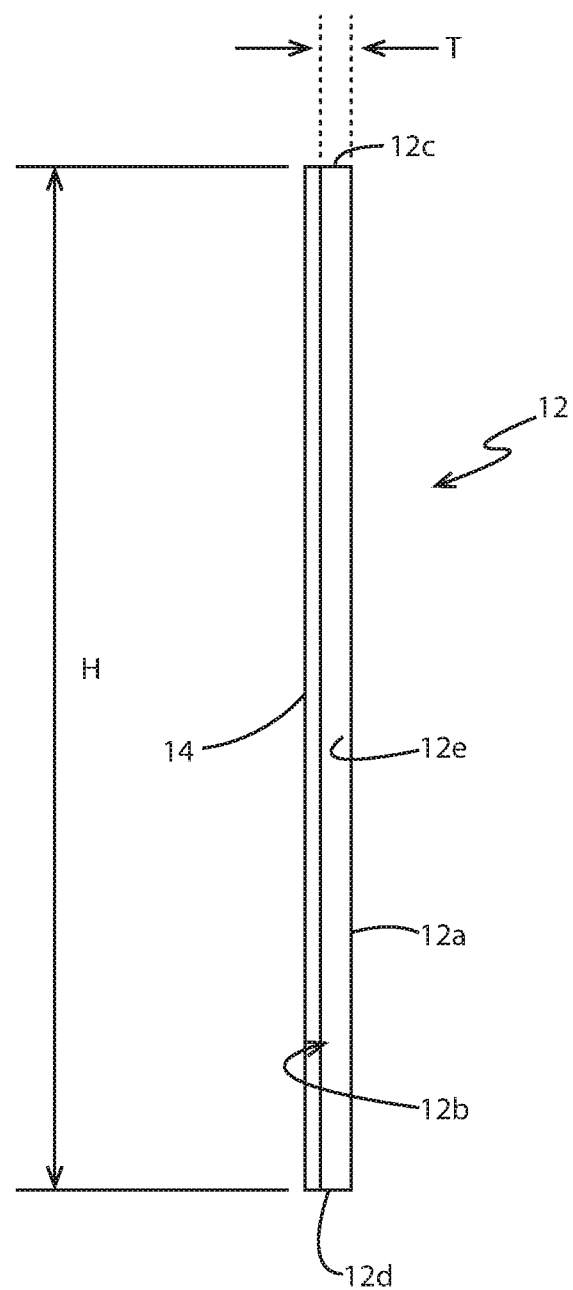
FIG. 5 is left side elevation view of the sheet of acrylic shown in FIG. 4.

As shown in FIGS. 2 and 5, Sheet 12 has a height "H" measured from top edge 12c to bottom edge 12d; a length "L" measured from left side edge 12e to right side edge; and a thickness "T" measured from front surface 12a to back surface 12b. In some examples, when pulled and cut, the sheet 12 of acrylic may have a height "H" of about 74", a length "L" of about 124", and a thickness "T" of about 0.1 ml (3/32"). This size sheet 12 is of suitable dimensions to pull and vacuum-form a standard 8', four tread pool step. It will, of course, be understood that other differently sized transparent sheets of acrylic may be utilized to make other pool steps of other sizes and configurations. Pool steps typically range in size from 2', 4', 6', 8', and 10' in length for example. The particular dimensions of the sheet 12 of acrylic selected will vary depending on the size of step 10 that is being manufactured.

In accordance with an aspect of the present disclosure a desired pattern is printed onto the acrylic sheet. The pattern is selected from a variety of differently-configured patterns that are suitable for use on vinyl swimming pool liners. The desired pattern selected for printing on sheet 12 will be one that matches a pattern on the pool liner that is to be used on a rest of the pool into which the pool step 10 will be installed. This will be described later herein.

In accordance with an aspect of the disclosure, the desired and selected pattern is only printed on one side of the sheet 12. In particular, the selected pattern 14 (FIGS. 4 and 5) is printed over the outside of back surface 12b of sheet 12. The front surface 12a all the way through to back surface 12b remains transparent or clear. The pattern 14 is visible through front surface 12a. It should be understood that the pattern 14 may be printed onto back surface 12b in any suitable manner known in the printing arts.

The pattern 14 may be printed onto back surface 12b of sheet 12 utilizing distortion printing. In other words, a distorted image of the pattern 14 is printed onto back sheet 12b prior to vacuum forming of sheet 12. Portions of the printed image will appear in corresponding areas of the three-dimensional end product. Using distortion printing ensures that after vacuum forming of sheet 12, the final printed pattern 14 that is visible through front surface 12a will appear substantially similar to a pattern on a pool liner adjacent the pool step. The final printed pattern 14 will not tend to have a distorted appearance. If distortion printing is not used, the pattern on the end product could have a tendency to appear distorted.

It will be understood that the printing facility that prints the decorative pattern 14 onto acrylic sheet 12 typically will be different from a facility where the sheet is vacuum formed. If this is the case, then the printed sheet 12 may need to be transported from a first facility to a remote second facility. If this is the case, one or more identically patterned sheets 12 may be printed and the plurality of printed sheets may then be packaged in air-tight foil and be shipped to a pool step fabricating facility for further processing. Once the foil package is opened at the pool step fabricating facility, sheet 12 should be processed within thirty days. If the processing does not occur in this time period, then the top sheet 12 in the foil package may get moisture in it and will not be able to be utilized.

When fabrication of the pool step 10 is to occur, sheet 12 is placed into a vacuum forming oven for a first time period to heat or warm the sheet 12 to a working temperature. For example, the first time period may be about three minutes and the working temperature may be about 290° F. The heated sheet is more pliable than a cold sheet. The heated sheet 12 (shown in FIG. 6) is removed from the oven and lowered into position over a mold 16.

It is contemplated that the heat on certain areas of the vacuum forming oven may be adjusted before the sheet 12 is drawn. Applying less heat to certain parts of the heated sheet 12 may tend to reduce any possibility for a "stretched look" to develop in the printed pattern on the sheet 12 relative to the liner pattern. The heat applied strategically to the sheet 12 may tend to reduce stretch and thereby unwanted pattern distortion.

Mold 16 may be a vacuum form mold or any other mold suitable for the purpose. Mold 16 has a three-dimensional configuration and includes an exterior surface 16a and an interior surface (not shown) that is opposed to exterior surface 16a. The exterior surface 16a includes a molding surface that has a three-dimensional shape that will be imparted to materials molded thereon. In particular, the molding surface of mold 16 includes one or more stairs 16c (including tread regions, riser regions, and side surfaces extending upwardly therefrom), and a horizontally-oriented top skirting 16d and a vertically oriented sidewall skirting 16e that bound the stairs 16c. Other than the molding surface, the mold 16 may also include supporting structures such as a peripheral wall 16f or any other type of support frame that supports the molding surface, i.e., the stairs 16c, top skirting 16d, and sidewall skirting 16e. The peripheral wall 16f or support frame helps to ensure that the mold 16 is sufficiently rigid enough to support sheet 12 during vacuum forming but the sheet of moldable material typically will not extend over the supporting structures of mold 16. It will be understood that the illustrated configuration of mold 16 is by way of example only and shouldn't be construed to limit the scope of the disclosed subject matter in any way. A differently configured mold may be utilized if the pool step is desired to be differently configured from the step shown in FIG. 1.

Figure 6:
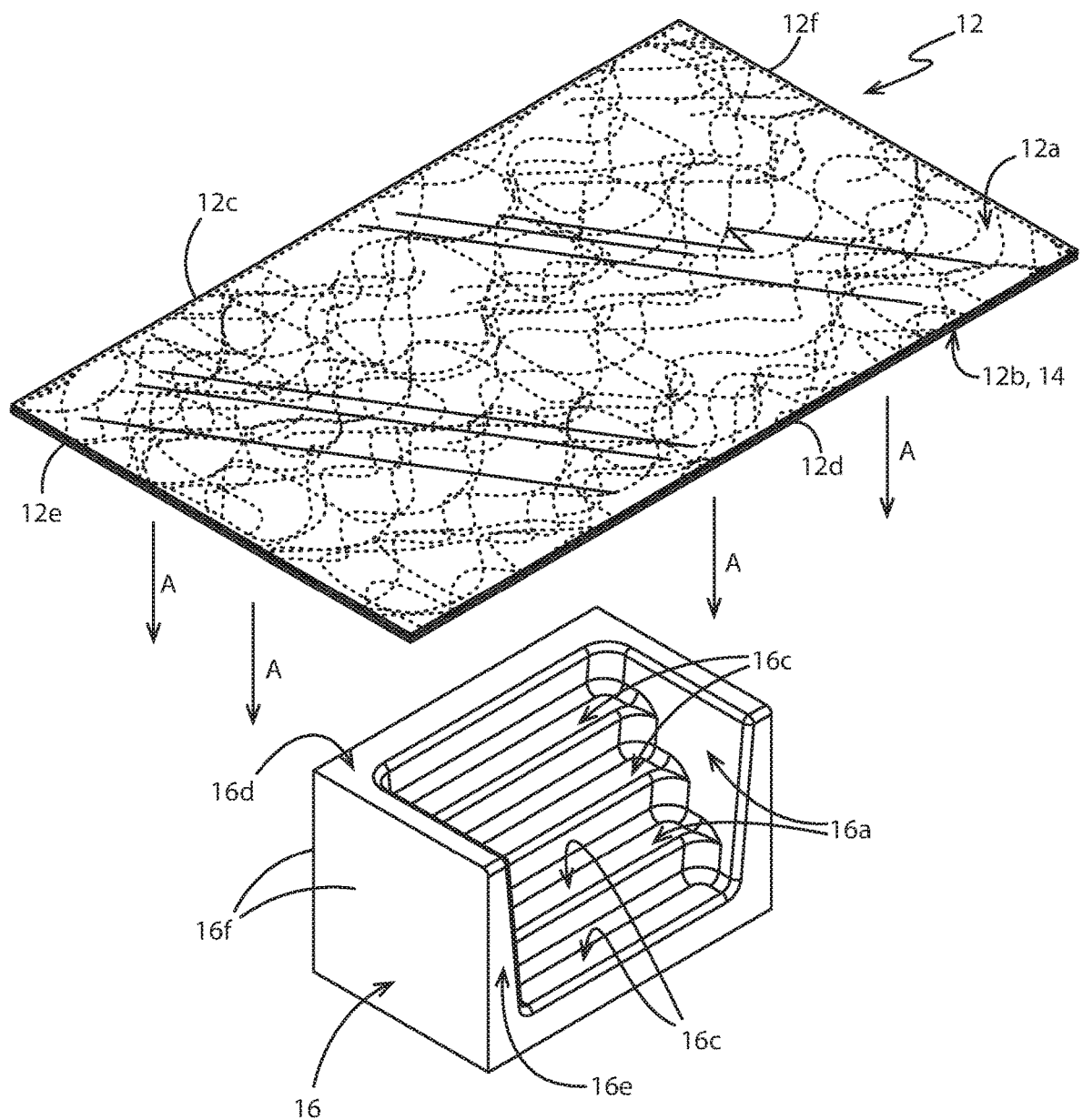
FIG. 6 is a top front perspective view of the printed sheet of acrylic being lowered onto a vacuum form mold tool after heating of the sheet.

In accordance with an aspect of the present disclosure, the heated sheet 12 is lowered into place over mold 16 as indicated by the arrows "A" in FIG. 6. In one example, sheet 12 is oriented such that back surface 12b of sheet 12 is placed into abutting contact with a portion of the exterior surface 16a of mold 16. In particular, the printed pattern 14 on back surface 12b is placed face-down in abutting contact with the exterior surface 16a of mold 16. The front surface 12a of sheet 12 is located remote from the upper/exterior surface 16a of mold 16 and faces outwardly from mold 16. As such, the front surface 12a is positioned so that, once molded, the front surface 12a will form a part of pool step 10 that ultimately will be contacted by water held with the swimming pool. The back surface 12b is positioned so that, once molded, the back surface 12b will form a part of pool step 10 that ultimately will not be contacted by water within the swimming pool. This particular orientation of sheet 12 on mold 16 will result in the printed pattern 14 being located beneath the clear or transparent acrylic layer in the pool step 10. Consequently, none of the printed pattern 14 will be directly exposed to the effects of water-chemistry or to physical scuffing and or scratching because it is protected by the entire thickness "T" of the sheet 12.

It will be understood that in another example, which is not illustrated herein, the mold itself may be a negative of the mold 16 illustrated in the attached figures. In this instance, the sheet 12 will be positioned such that the printed pattern 14 is located remote from the molding surface of the mold. Regardless of how the mold is constructed and how the sheet 12 is placed on the molding surface thereof, when the end product (i.e., the pool step 10) is released from the mold, the surface that includes the decorative pattern will be located a distance inwardly away from the outermost surface of the pool step. Consequently, when the pool step 10 is installed in a pool, the surface of the sheet that includes the printed decorative pattern will not be contacted by pool water or by persons walking up and down the stairs of the pool step. The decorative pattern, though located a distance inwardly from the outermost surface of the pool step will be clearly visible because of the transparent acrylic material positioned between the decorative pattern and the outermost surface of the pool step.

In one example, prior to placing sheet 12 over exterior surface 16a of mold 16, the exterior surface 16a is sprayed with a mold-release product. The mold-release product may be any suitable substance that will ultimately help to release the formed acrylic component from mold 16. If this step is omitted, it may be quite difficult to remove the molded part from the mold 16. Suitable types of mold-release product that may be used for this purpose are CHEM-TREND® or CAMIE® 1080. (CHEM-TREND® is a registered trademark of Chem-Trend Limited of Howell, Mich., USA; CAMIE® is a registered trademark of Camie Company, Inc. of St. Louis, Mo., USA.) The mold-release product may be applied by hand.

Figure 7:
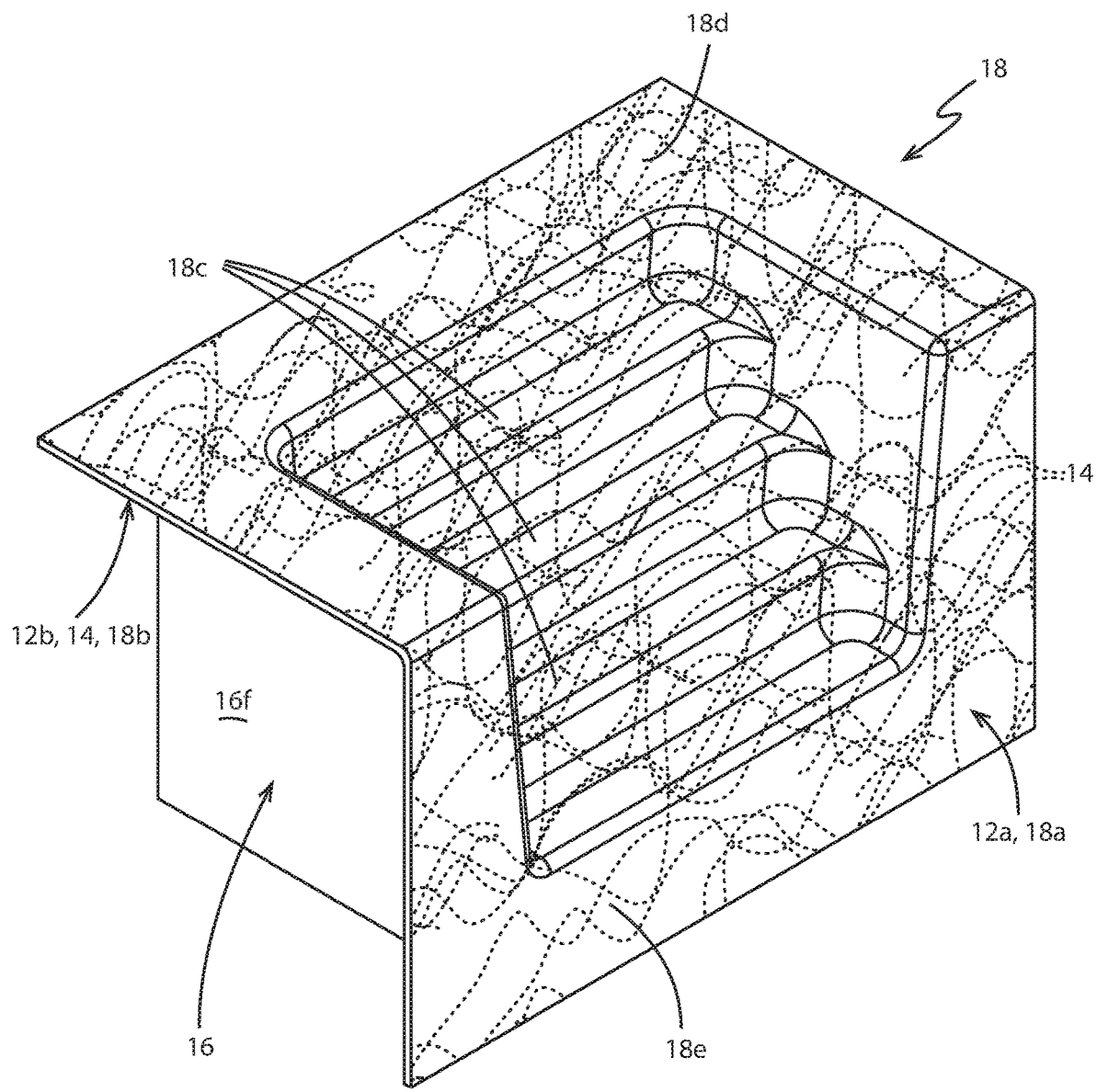
FIG. 7 is a top front perspective view of the sheet of acrylic molded into a step configuration by the vacuum form mold tool and showing the molded sheet still engaged with the mold tool.
Figure 8:
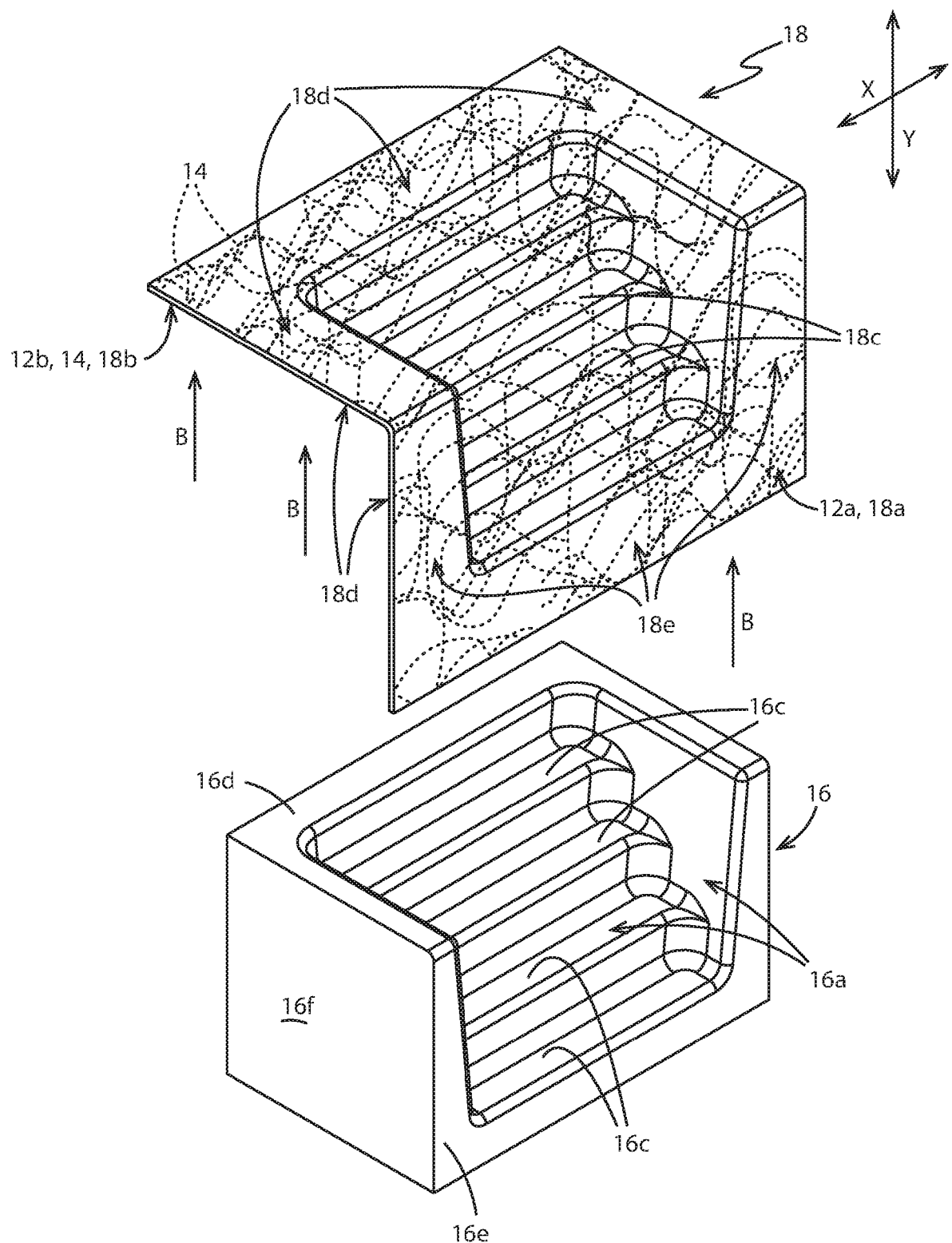
FIG. 8 is a top front perspective view of the molded sheet being lifted off the mold tool.
Figure 9:
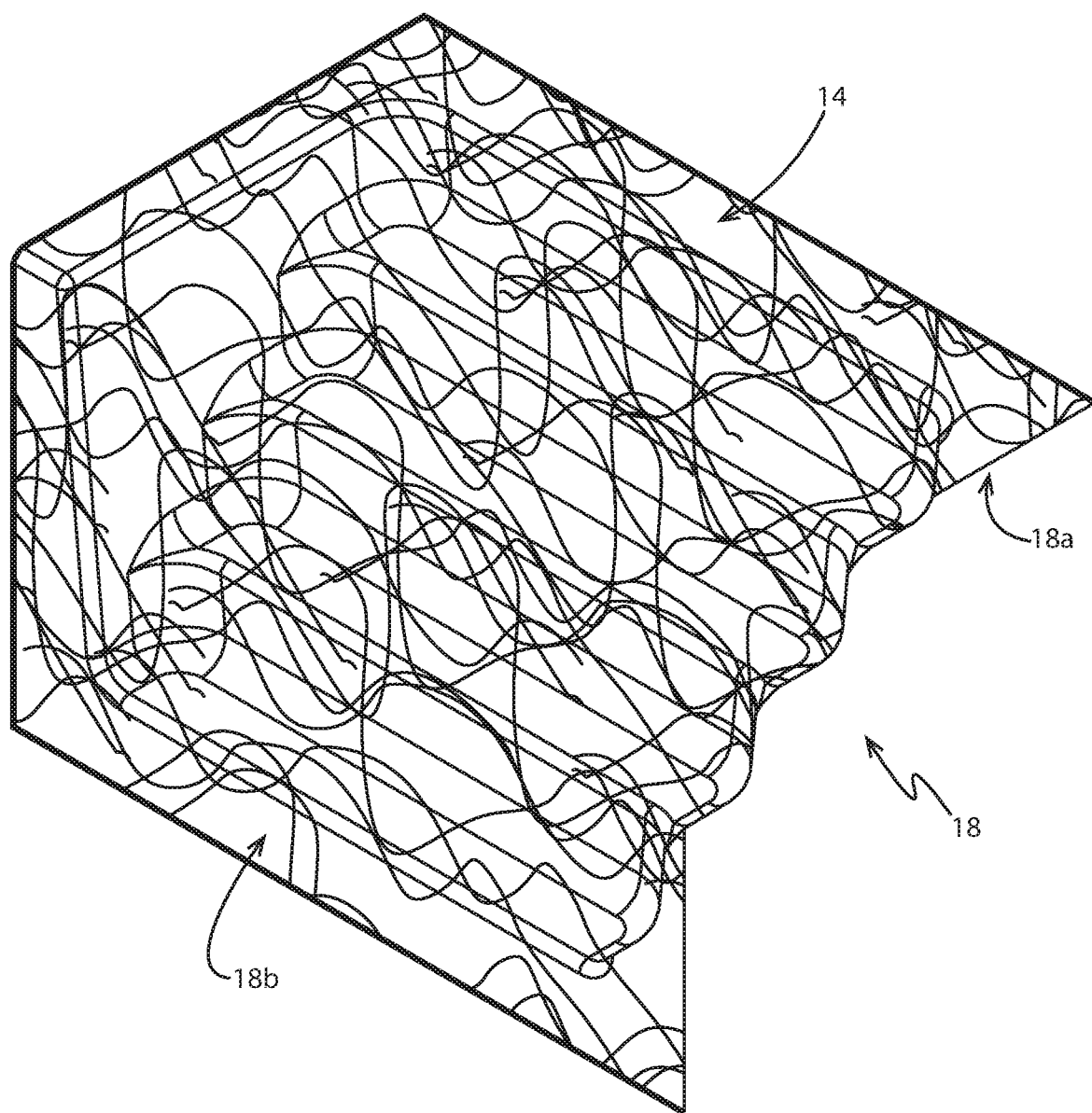
FIG. 9 is a top rear perspective view of the molded sheet showing the decorative pattern printed on the back surface thereof.

After the mold-release product is applied to the exterior surface 16a of mold 16, the heated sheet 12 is placed thereover as described above, is stretched over the mold 16 and held in place for several minutes. In particular, a vacuum system may be used to hold sheet 12 in place on mold 16 using vacuum suction. As indicated above, mold 16 discussed herein is a vacuum form mold tool but it will be understood that any other type of forming may be utilized. The stretching and holding of sheet 12 against the three-dimensional shape of mold 16 will cause sheet 12 to be formed and take on the three-dimensional shape of the three-dimensional surface it contacts. This three-dimensional molded sheet will be referred to hereafter as "molded sheet 18" and is illustrated in FIG. 7.

Molded sheet 18 is lifted off from mold 16 in the direction of arrows "B" (FIG. 8) and is cooled. Partial cooling of molded sheet 18 may occur before molded sheet 18 is removed from mold 16 and cooling may continue after molded sheet 18 is removed from mold 16. Molded sheet 18 has an exterior surface 18a and an interior surface 18b. Molded sheet 18 further includes one or more stairs 18c formed therein, a horizontally-oriented top skirt 18d, and a vertically-oriented sidewall skirt 18e.

Once lifted off mold 16, molded sheet 18 will subsequently be placed onto a special holding jig (not shown) and will be clamped into place on the jig. The holding jig is essentially a frame structure that is utilized to ensure that molded sheet 18 is held straight and level during the next step in the production process. As indicated above, molded sheet 18 includes a horizontally-oriented top skirt 18d and a vertically—oriented sidewall skirt 18e. Because of the configuration of pool step 10, each of the top skirt 18d and sidewall skirt 18e is substantially Y-shaped when pool step 10 is viewed from the front. The holding jig holds top skirt 18d substantially parallel to the horizontal, indicated by axis "X" in FIG. 8. The holding jig holds sidewall skirt 18e substantially parallel to the vertical, indicated by axis "Y" The holding jig further ensures that top skirt 18d is also maintained at right angles to vertical axis "Y", The axis "X" may be oriented parallel to a floor of a fabrication facility. This straight and level orientation of molded sheet 18 is relevant in the next production step.

Once the molded sheet 18 is engaged with holding jig, the interior surface a protective material 20 is applied over the printed pattern 14. If there are any portions of the interior surface 18b of molded sheet 18 that are devoid of the decorative pattern 14, i.e., not covered by the decorative pattern 14, then protective material 20 will be applied thereover as well as any portions of back surface 12b that are exposed (i.e., not covered with decorative pattern 14). One suitable type of protective material 20 is sold under the trademark SPRAYLAT® LACRYL® 491. (SPRAYLAT® and LACRYL® are registered trademarks of PPG Industries of Cleveland, Ohio, US.) SPRAYLAT® LACRYL® 491 is a plastic paint that, according to the manufacturer, is "designed for use on plastic and flexible vinyl materials including acrylic, polycarbonate, butyrate, and vinyl. LACRYL is supplied as a concentrate and requires thinning before spraying. LACRYL is an air dry acrylic lacquer and provides durability and fade resistance on plastic signs, including polycarbonate and acrylics. The LACRYL 400 Series is a translucent spray paint for plastic signs". The SPRAYLAT® LACRYL® 491 may be sprayed onto the rear surface 18b of molded sheet 18 using any suitable type of hand-held spray gun or machine spray gun suitable for use with the protective material 20. The SPRAYLAT® LACRYL® 491 dries to a clear matte finish that will not adversely impact the printed pattern 14 over which it is applied. Other protective made by the same manufacturer and sold as part of the 400 series may be utilized instead of the SPRAYLAT® LACRYL® 491. It will be understood that other different but suitable protective materials may be applied over printed pattern 14 and exposed regions of back surface 12b instead of the SPRAYLAT® LACRYL® 491. The protective material 20 ensures that the printed pattern 14 is maintained in place and will not be adversely affected during the next step of the production process.

As indicated above, the protective material 20 may be sprayed onto the interior surface 18b using a suitable spray gun as recommended by the manufacturer of the protective material. In other instances, the protective material 20 may be painted on or otherwise applied onto the interior surface 18b of molded sheet 18. Whether the protective material is sprayed or applied in another manner to interior surface 18b, the material 20 will be applied in both a horizontal direction (parallel to axis "X" showing in FIG. 8) and in a vertical direction (parallel to axis "Y"). This ensures that there is total coverage of the interior surface 18b of molded sheet 18. It will be understood that instead of the protective material 20 being applied in a horizontal direction and a vertical direction, a first coating of the material 20 may be applied at any other angle relative to the "X" axis and/or "Y" axis and then a second coating of the material 20 may be applied thereover and at right angles thereto.

If holding jig or any other type of holding and orienting mechanism does not hold molded sheet 18 substantially straight and level, some of the liquid (or atomized) protective material 20 sprayed or applied onto interior surface 18b may simply run off molded sheet 18. As a consequence, parts of the molded sheet 18 may not be adequately covered with protective material 20. The sprayed or applied protective material 20 dries and forms a protective layer over the entire interior surface 18b of molded sheet 18, i.e., over printed design 14 and over regions of back surface 12b. It is contemplated that no part of front surface 12a of sheet 12 and thereby of exterior surface 18a (FIG. 10) of molded sheet 18 is coated with the protective material 20. In this way, front sheet 20 remains transparent and therefore pattern 14 remains visible therethrough.

Figure 10:
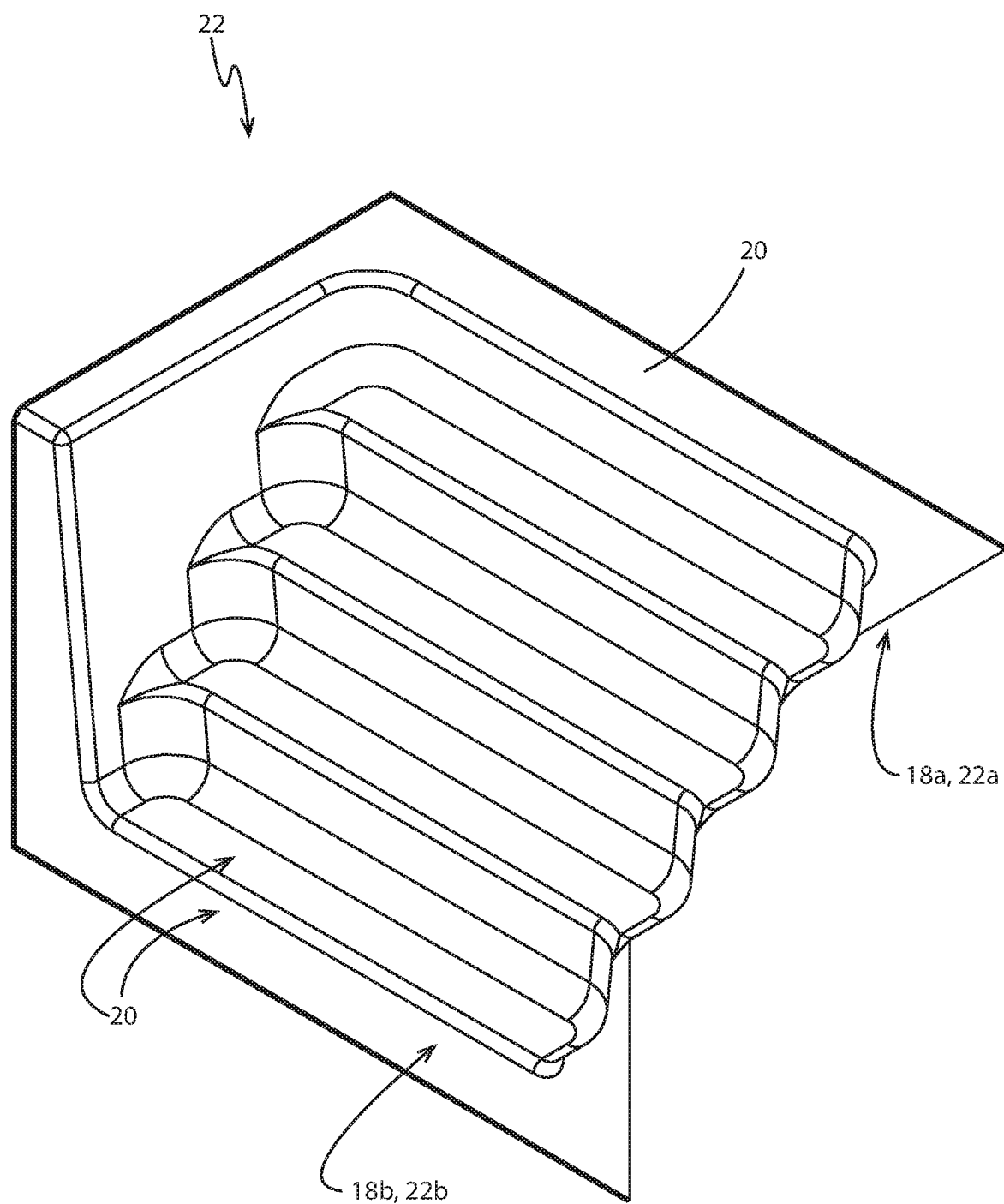
FIG. 10 is a top rear perspective view of the molded sheet after the application of a protective material thereon.
Figure 11:
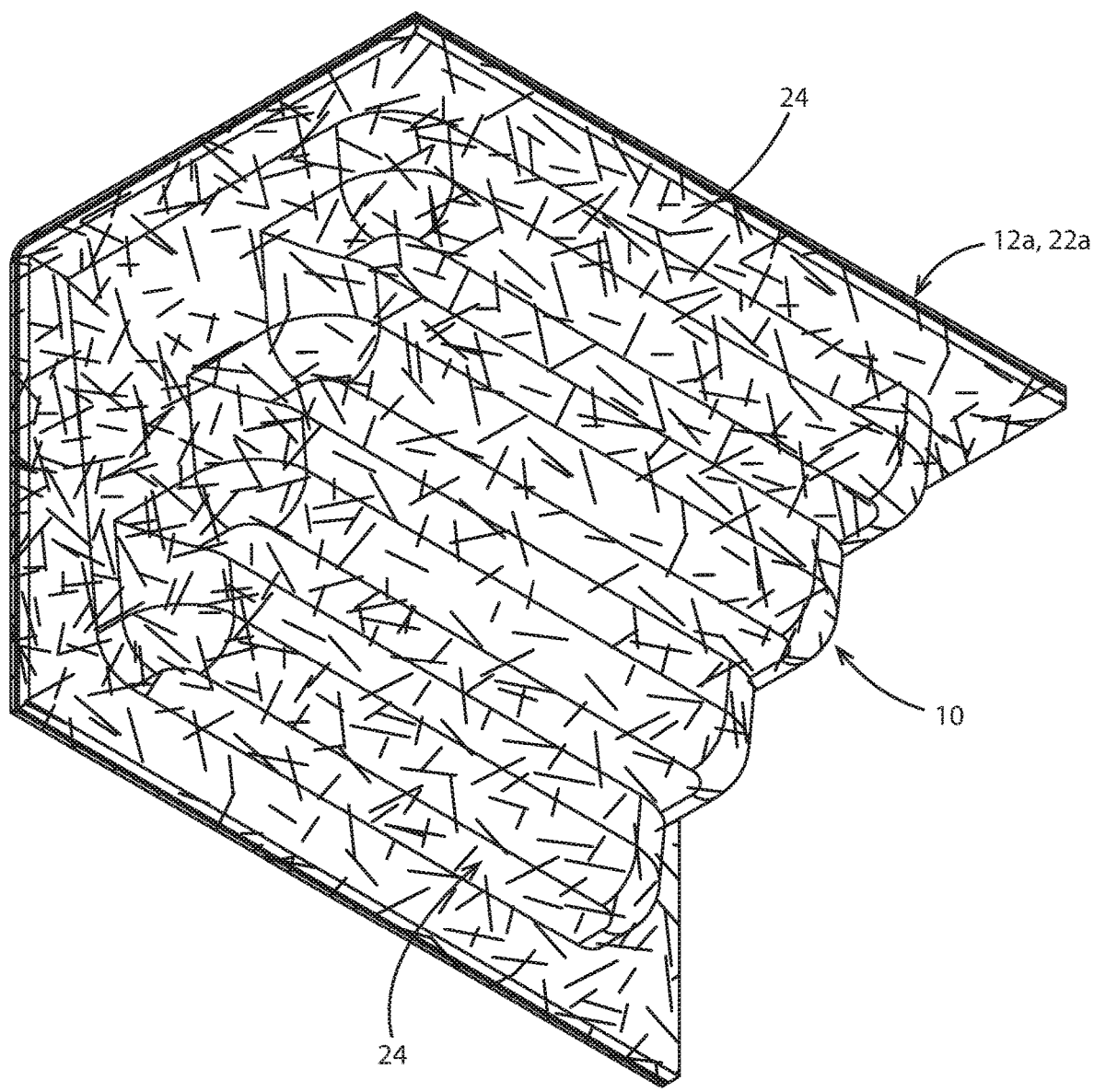
FIG. 11 is a top rear perspective view of the molded sheet after application of chopped glass resins and fiberglass over the layer of protective material.

The protective material-coated molded sheet is indicated in in FIG. 10 by reference number 22 and will be referred to hereafter as "coated molded sheet 22". Coated molded sheet 22 has an exterior surface 22a that is uncoated and an interior surface 22b that is coated. The coated molded sheet 22 may then have a coating of vinyl ester resins applied over the protective layer 20 on interior surface 22b. The vinyl ester resins are utilized to create a tacky surface that allows for better adhesion of fiberglass reinforcement materials 24 (FIG. 11) that are subsequently applied over the interior surface 22b of coated molded sheet 22 in the next production step. A marine grade resin may be utilized instead of a vinyl ester resin. In one example, the fiberglass reinforcement materials 24 may be applied directly over the decorative pattern 14. The resin is applied by chopper gun such as the chopper gun made by Magnum Venus Plastech of Kent, Wash., USA.

In the next production step, fiberglass reinforcement materials 24 are applied over the vinyl ester resins or marine grade resin on interior surface 22b of the coated molded sheet 22. The fiberglass reinforcement materials 24 may include an all-purpose general resin with chopped Fiber-Reinforced Plastic (FRP) materials and fiberglass roving fiber materials therein. This material 24 helps to reinforce the rigidity of the end product, i.e., pool step 10, and may also provide insulative properties to pool step 10. In order to help avoid overheating of the sheet 12 during reinforcement thereof with fiberglass materials 24, the fiberglass materials 24 may progressively be applied in thin layers as will be later described herein. Overheating of the coated molded sheet 22 is undesirable as it will tend to stretch and distort the pattern printed thereon.

Figure 12:
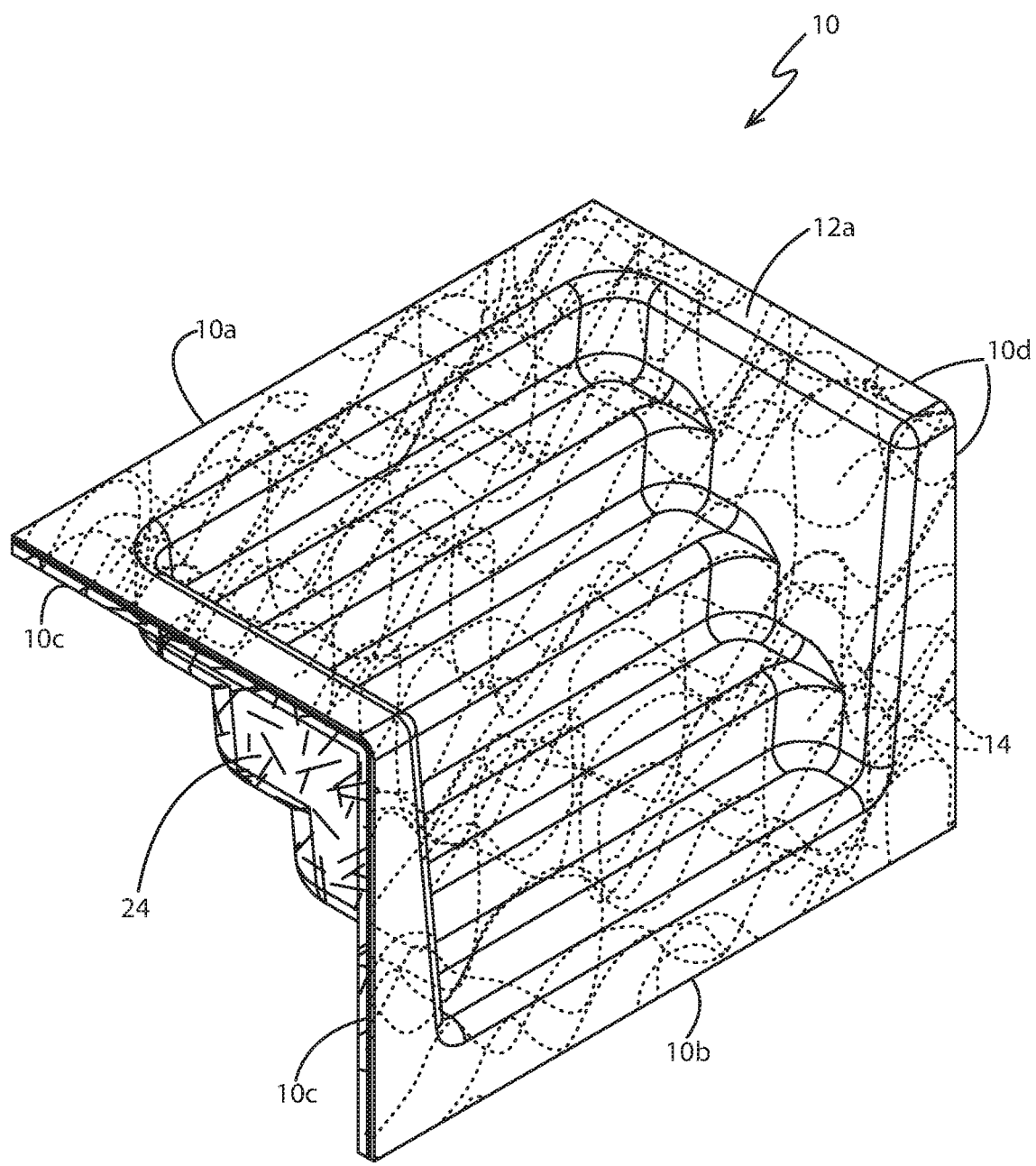
FIG. 12 is a top front perspective view of the end product showing the outer surface being a layer of transparent acrylic and the fiberglass layer on the inner surface.

As shown in FIG. 12, the front surface 12a of transparent acrylic sheet 12 comprises the outermost layer of the pool step 10 and the undistorted decorative pattern 14 is visible through this clear front surface 12a. The entire thickness "T" of sheet 12 aids in protecting pattern 14 from exposure to pool water, sunlight, pool chemicals and direct contact with objects that might scratch or otherwise damage pattern 14.

Once fabricated as described above, pool step 10 may then be finished and readied for installation. The finishing steps may include hand-cutting and hand-sanding (not shown) the edges 10a, 10b, 10c, 10d to the exact required specifications for installation into an engineered swimming pool steel wall kit. The end product, i.e., pool step 10, may have a total weight of about 140 lbs, Although not illustrated herein, other finishing steps may include attaching front polyvinylchloride faceplates, cover strips (to hide screws), and various gaskets to pool step 10. In other embodiments, pool step 10 may not include faceplates.

Figure 13:
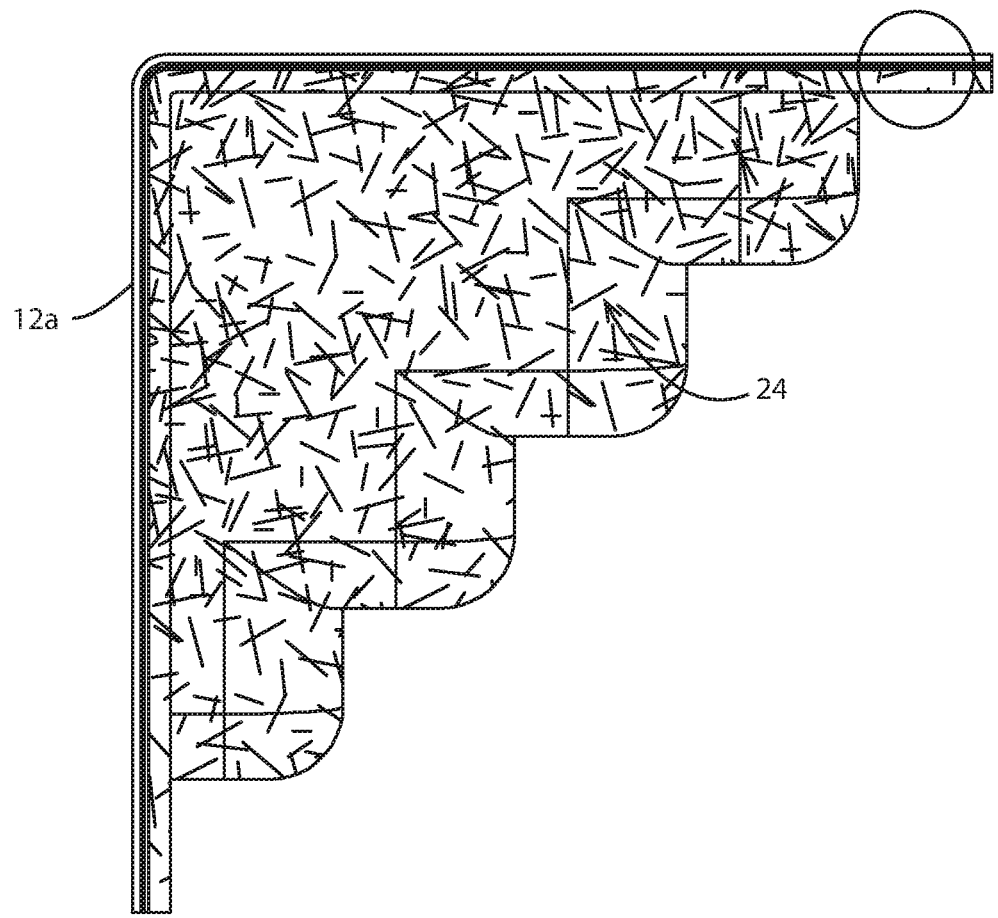
FIG. 13 is side elevation view of the end product.
Figure 14:
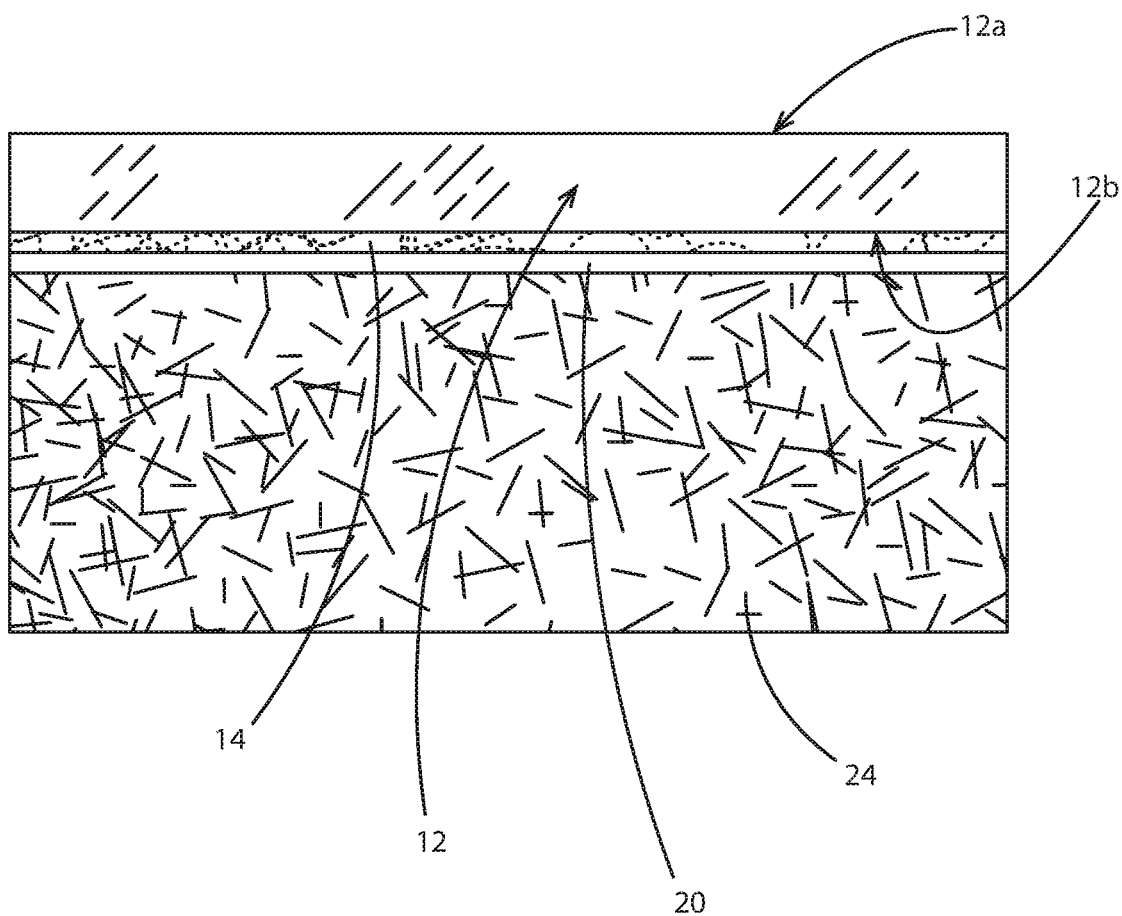
FIG. 14 is an enlargement of the highlighted region of FIG. 13.

FIG. 14 shows an enlargement of the highlighted region of pool step 10 of FIG. 13. As is evident from this figure, acrylic sheet 12 forms the outermost layer of pool step 10, with front surface 12a comprising the outermost surface of the outermost layer. The printed pattern 14 forms a second layer of pool step 10 and is in abutting contact with back surface 12b. All of the acrylic layer 12 is located between printed pattern 14 and the environment that is located outwardly beyond front surface 12a of sheet 12. Because the acrylic layer 12 is transparent, the printed pattern 14 is readily visible through the transparent layer 12. Protective layer 20 is located inwardly of printed pattern 14 and separates printed pattern 14 from the fiberglass layer 24.

Figure 15A:
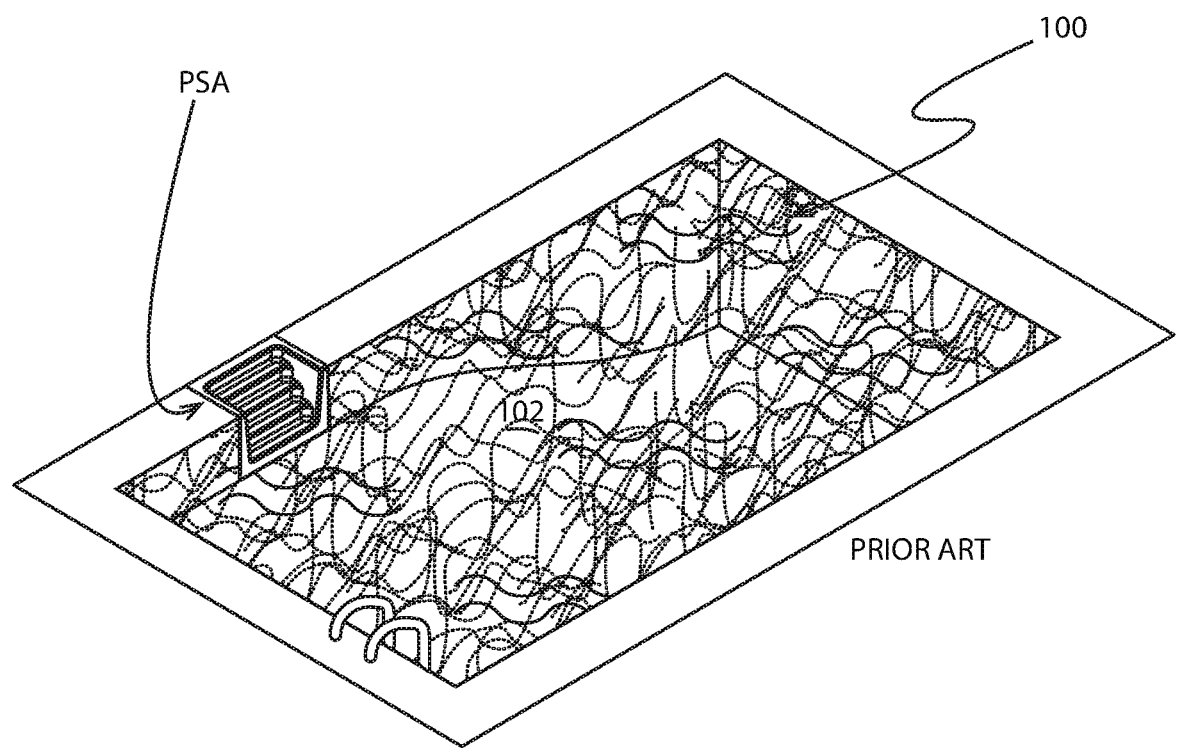
FIG. 15A is a diagrammatic perspective view of a swimming pool showing a FIRST PRIOR ART pool step.

FIG. 15A shows a swimming pool 100 that includes a liner 102 that has a particular decorative pattern thereon. A first PRIOR ART pool step PS is installed in swimming pool 100. As is evident from this figure, the first pool step PS is a solid color and is devoid of any pattern.

Figure 15B:
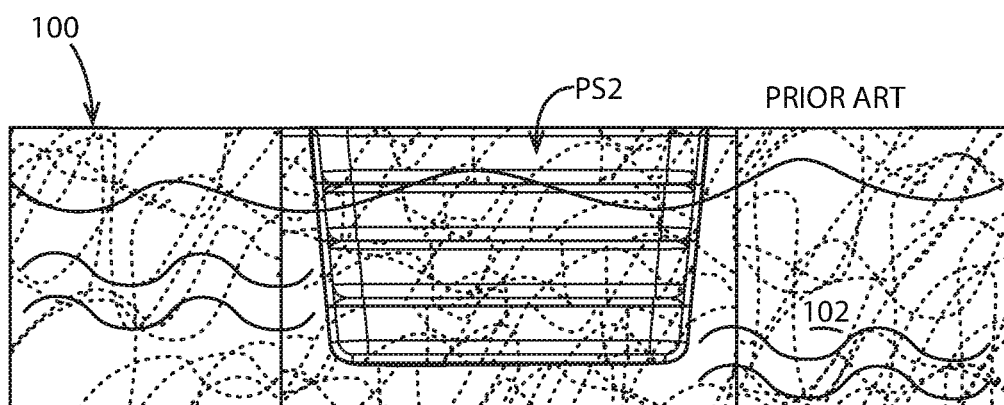
FIG. 15B is a diagrammatic enlarged front elevation view of a portion of the swimming pool showing a second PRIOR art pool step.

FIG. 15B shows an enlarged region of the swimming pool 100 that includes the liner 102 having the same decorative pattern thereon. A second PRIOR ART pool step PS2 is illustrated herein. Second pool step PS2 is a steel step that is covered with a portion of the liner 102. The fitting of the liner over the steep step is a labor intensive, time consuming job. Not only is this process time consuming, but the portion of the vinyl liner used on steel steps can also form wrinkles and may be slippery. If non-steel steps are utilized, then a heavy tread pattern is typically formed into an exterior surface of a special vinyl and this tends to make the pool step different to the rest of the pool liner.

Figure 16:
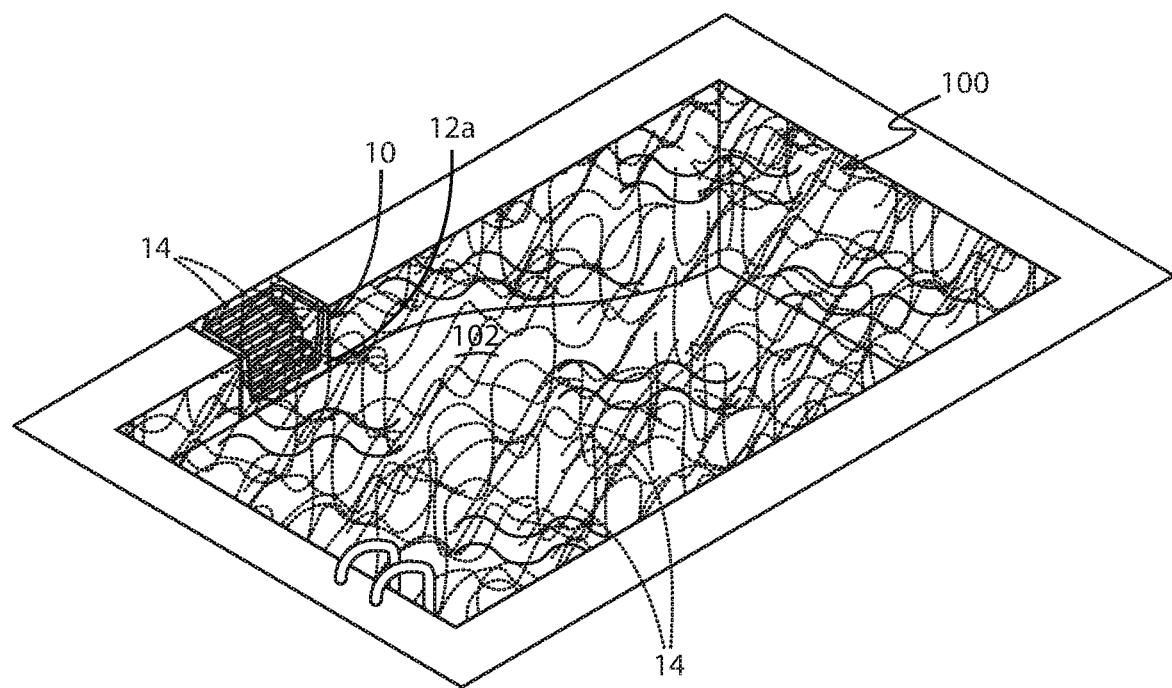
FIG. 16 is a diagrammatic perspective view of a swimming pool showing a pool step in accordance with the present disclosure.

FIG. 16 shows a diagrammatic view of a swimming pool 100 that includes a pool liner 102 on the sidewalls and bottom. The pool liner 102 is provided with a decorative pattern 14 thereon. FIG. 16 also shows a pool step 10 in accordance with an aspect of the present disclosure. As is evident from the figure, the printed pattern 14 on pool step 10 is complementary to the decorative pattern 14 on the pool liner 102 that is used to cover the rest of the pool interior, i.e., the pool's sidewalls and bottom wall. In other words, the pattern 14 on the pool step 10, although applied to a three-dimensional object, looks substantially identical to the pattern 14 on the pool liner 102. The pool step 10 therefore essentially disappears into the pattern 14 on the pool liner 102 instead of drawing the viewer's eye to the step because it looks different and discontinuous (as is the case with the PRIOR ART pool steps PS, PS2). Because the pattern 14 is printed onto back surface 12b of sheet 12 prior to molding of pool step 10 therefrom, the decorative pattern 14 is able to be identical to the decorative pattern 14 provided on pool liner 102 that is used to cover the rest of the swimming pool 100.

Figure 17:
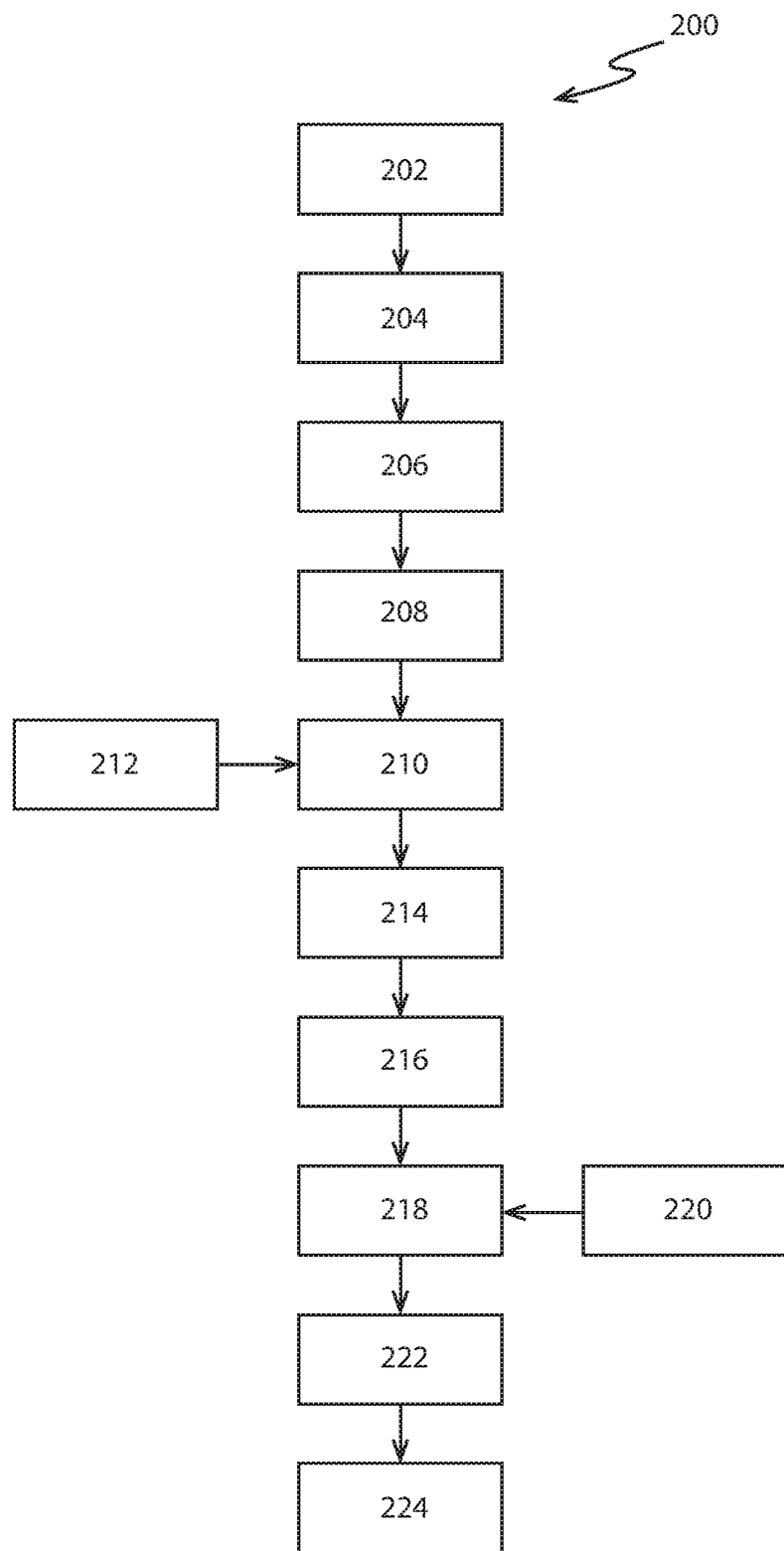
FIG. 17 is a flowchart showing a method of matching a pattern on a pool step with a pattern on a pool liner.

The method 200 of constructing a pool step 10 and matching a pattern on pool step 10 with a pattern on a pool liner 102 in accordance with the present disclosure is shown in the flow chart set out in FIG. 17. In a first step 202 of method 200 a sheet 12 of clear acrylic material is pulled and cut. In a second step 204 of method 200, a decorative pattern 14 to be printed onto sheet 12 is selected from a group of possible pool liner patterns. In particular, the decorative pattern 14 that is selected is one that is identical to a decorative pattern 14 to be used on a pool liner 102 that is to be applied to the interior surfaces of the rest of the pool 100, In a third step 206, the decorative pattern 14 is printed onto the back surface 12b of the sheet 12. (In other instances, as described above, if the pool step mold is differently configured, the decorative pattern 14 may be printed onto the front surface 12a of the sheet 12.) As indicated earlier herein, the pattern 14 is printed using distortion technology.

In a fourth step 208, the sheet 12 with pattern 14 printed thereon is heated so that the sheet 12 becomes pliable. In a fifth step 210, the heated sheet 12 is placed over a pool step mold 16. Prior to the fifth step 210 and in some instances prior to the fourth step 208, a mold-release product may be applied to the pool step mold 16. This is indicated by the box 212 on FIG. 17. In particular, the mold-release product may be sprayed onto the surface(s) of the pool step mold 16 that will contact the sheet 12, i.e., 16a, 16c, 16d, and 16e.

While it is not contemplated to occur in the presently disclosed process, the mold-release product may be applied to the sheet 12 instead of to the pool step mold 16. In particular, the mold-release product may be applied to the surface 12b of the sheet 12 that will contact the pool step mold 16.

In a sixth step 214, vacuum suction is applied to the sheet 12 and the sheet 12 is vacuum-formed into a molded sheet 20.

In a seventh step 216, the molded sheet 20 is de-molded, i.e., lifted off the mold 16. The seventh step 216 may include wiping or spraying down the de-molded sheet 20 with a cleaning product to remove any unwanted residue of the mold-release product. Additionally, as part of the seventh step 216, a protective coating 20 is applied to the interior surface 12b of molded sheet 20 and over printed pattern 14 and any exposed regions of interior surface 12b to form a coated molded sheet 22. The protective coating 20 may be applied in a first direction and then in a second direction at an angle, particularly right angles, to the first direction.

In a seventh step 218, fiberglass materials 24 are applied over the protective coating 20 to form an end product, i.e., pool step 10. In other words, the fiberglass materials 24 are applied to an interior surface of coated molded sheet 22. Prior to the seventh step 218, a bonding agent, such as any suitable vinyl ester resin or a marine resin, is applied over the protective coating 20 and this application of the bonding agent is indicated by the box 220.

The seventh step 218 of applying fiberglass materials 24 may comprise a plurality of sub-steps, namely, that a first layer of fiberglass material 24 is sprayed onto the coated molded sheet 22 and the first layer of fiberglass is then allowed to cure. The sub-step of allowing the first layer of fiberglass material to cure may include allowing a certain pre-determined passage of time to pass and/or subjecting the fiberglass-coated sheet to particular conditions to enable drying of the fiberglass material to occur, and then verifying that the first layer is cured. A second layer of fiberglass material 24 may then be sprayed over the first layer of fiberglass material 24 and be allowed to cure. A third layer of fiberglass material 24 may then then sprayed over the second layer of fiberglass material 24 and is allowed to cure. As many layers of fiberglass material as are needed may be sprayed onto coated molded sheet 22 with an appropriate cure time being permitted between each layer. In other words, only a single layer of fiberglass materials may be utilized, or two layers, or three layers, or more than three layers.

In an eighth step 222, pool step 10 is finished. The finishing can include adding retention strips, applying one or more faceplates, cover strips, and gaskets to pool step 10. The eighth step 222 also includes trimming the end product including hand-cutting, hand-sanding. Still further, the eighth step 222 includes completing the end product by adding sealing and beauty strips with screws. The completed end product may then be packaged for shipping. In a ninth step 224, the completed pool step 10 is shipped to the location where it is to be installed and is actually installed. In particular, the completed pool step 10 is installed in the pool 100 adjacent the liner 102 as part of an engineered swimming pool steel wall kit. The installation of pool step 10 relative to liner 102 is able to be performed in any manner known in the art. The end result is that the pool step 10 has a decorative pattern 14 thereon that is substantially identical to the decorative pattern 14 on pool liner 102. When pool step 10 is installed and pool 100 is filled with pool water, outer surface 12a of sheet 12 is put into contact with the pool water and the decorative pattern 14 is prevented from coming into contact with pool water by the thickness "T" (FIG. 5) of the sheet 12. Consequently, anyone entering or exiting swimming pool 100 utilizing pool step 10 will not come into contact with decorative pattern 14.

Pool step 10 is installed in exactly the same manner as any currently known molded pool step and therefore the actual installation is not described in any detail herein. Although not illustrated herein, it will be understood that during the installation of pool step 10 and liner 102 on the pool 100, the installer will remove any faceplates (that were installed during finishing) from both of the horizontally-oriented top skirt and a vertically-oriented sidewall skirt of pool step 10 and place the liner 102 on the front surface 12a of the pool step 10. Next, the installer will place the previously removed faceplates over the portion of the liner 102 that overlays front surface 12a and will attach the three sides using stainless steel screws (typically around 72 screws). These screws are secured to a hard rubber retention strip. The strip will not allow the screws to leak swimming pool water. These strips are typically glassed into place during the final reinforcement stage of spraying the resin and fiberglass materials 24 over the interior surface of the coated molded sheet 22, i.e., on the back surface of the pool step. Once the strips are sprayed on, the retention strips are weighted down with heavy weights to ensure they are secure to the interior surface of the coated molded sheet 22.

In accordance with an aspect of the present disclosure a method of fabricating a pool step 10 having a pattern thereon includes applying a decorative pattern 14 to one surface 12a or 12b of a transparent sheet 12 of moldable material; molding the transparent sheet 12 of moldable material into a pool step 10; positioning the decorative pattern 14 a distance "T" inwardly from an outer surface (the other of 12a or 12b) of the pool step 10; and preventing direct contact with the decorative pattern 14 with a thickness "T" of the transparent sheet 12 of moldable material.

In the method, the placing of the one surface 12a or 12b may include placing the decorative pattern 14 in contact with a molding surface 16a of a pool step mold 16. Furthermore, the application of the decorative pattern 14 includes printing the decorative pattern on the one surface 12a or 12b of the transparent sheet 12 of material, particularly by using distortion printing.

In order to avoid overheating the surface 12a or 12b during printing and thereby distorting the printed image in an undesirable manner, the decorative pattern may be produced by progressively building up layers of the printed image on the surface 12a or 12b. The method may further include selecting a transparent acrylic material for use as the transparent sheet of moldable material.

During the fabrication of pool step 10, the method further includes heating the sheet 12 of moldable material after printing and before molding. The method may further include applying a mold-release product to the molding surface 16a of the pool step mold 16 prior to placing the sheet 12 of moldable material on the mold 16. The method further includes stretching the sheet 12 of material over the molding surface 16a and applying vacuum suction to the stretched sheet 12 of material. Once the sheet 12 has been molded it is removed from the mold 16 and the method further includes applying a protective material 20 over the printed pattern 14 and over any portions of the one surface 12a or 12b that are devoid of printed pattern 14. The application of the protective material 20 includes applying protective material 20 in each of a horizontal direction and a vertical direction. The method further includes applying a reinforcement material 24 over the protective material 20. The applying of the reinforcement material 24 is preceded by applying a resin over the protective material 20.

The method of fabricating pool step 10 further comprises finishing the pool step after applying of the reinforcement material. The finishing of the pool step 10 includes one or more of hand-cutting the pool step, hand-sanding the pool step, and attaching one or more of a faceplate, a cover strip, and a gasket to pool step.

A patterned pool step 10 for a swimming pool 100 comprising an outer layer 12 that is substantially entirely transparent, wherein the outer layer 12 includes an exterior surface 12a and an opposed interior surface 12b; and wherein at least a portion of the exterior surface 12a is one of contacted by pool water and used to exit or enter the swimming pool; and a decorative pattern 14 applied on the interior surface 12b of the outer layer 12, wherein the decorative pattern14 is spaced a distance inwardly "T" from the exterior surface 12a and is visible through the exterior surface 12a. A protective material 20 applied over the decorative pattern 14 and any portions of the interior surface 12b that do not include decorative pattern 14. The patterned step 10 further comprises a fiberglass reinforcement layer 24 applied over one of the decorative pattern 14 and the protective material 20 applied over the decorative pattern 14. A resinous material may be applied between protective material 20 and the fiberglass reinforcement layer 24. One or more of a faceplate, a cover strip, and a gasket may be engaged with the pool step. The outer layer 12 is molded into a three-dimensional shape that includes one or more steps and the decorative pattern 14 is complementary to a pattern 14 utilized on a pool liner 102 provided in the swimming pool 100 within which the pool step 10 is installed.

In accordance with an aspect of the present disclosure a method of matching a pattern 14 on a pool step 10 with a pattern 14 on a pool liner 102 includes selecting a decorative pattern for a pool liner from a group of decorative patterns; selecting a pool liner 102 for installation into a swimming pool 100, wherein the pool liner 102 has the decorative pattern 14 thereon. In a next step, a sheet 12 of moldable material is selected. Sheet 12 has an outside surface 12a and an inside surface 12b and is transparent. The selected decorative pattern 14 is applied to the inside surface 12b of the sheet 12. The application will be done by printing pattern 14 on sheet 12. The sheet 12 is placed on a pool step mold 16 and is molded into the three-dimensional shape and becomes pool step 10. Pool step 10 is installed into a swimming pool 100 such that the decorative pattern 14 is spaced a distance inwardly from the outside surface 12a and is visible through the outside surface 12a. The pool liner 102 is installed adjacent the pool step 12.

During fabrication, the placing of the sheet 12 of moldable material on mold 16 can include placing the inside surface 12b of the sheet of moldable material that includes the decorative pattern 14 against a molding surface 16a of pool step mold 16. During fabrication, the selecting of the transparent sheet 12 of moldable material comprises selecting a transparent sheet of acrylic. Additionally, the applying of the decorative pattern 14 comprises printing the decorative pattern 14 on the inside surface 12b of the sheet 12. The printing of the decorative pattern 14 includes utilizing distortion printing technology to print the decorative pattern 14 on the inside surface 12b of the sheet 12.

During fabrication, the placing of the inside surface 12b of the sheet 12 of moldable material is preceded by heating the sheet 12 for a predetermined time period at a predetermined temperature. Additionally, the placing of the inside surface 12b of the sheet 12 is preceded by spraying the molding surface 16a of the pool step mold 16 with a mold-release product. The molding of the sheet 12 is preceded by stretching the heated sheet 12 of moldable material over the molding surface 16a. The molding process may include applying vacuum suction to the stretched sheet 12, maintaining the vacuum suction for a predetermined period of time; and forming a molded sheet 18 having a three-dimensional configuration. The method further applying a layer of protective material 20 over the decorative pattern 14 and any exposed regions of the inside surface 12b of the sheet 12 after molding. The application of the layer of protective material 20 includes applying protective material in a horizontal direction and applying protective material in a vertical direction. The application of protective material 20 may include spraying the protective material 20 over the decorative pattern 14 and the exposed regions of the inside surface 12b of the sheet 12 and allowing the sprayed protective material to dry.

During fabrication, the application of the layer of protective material 20 is preceded by orienting the molded sheet 18 straight and level. The fabrication may also include applying one or more of a faceplate, a cover strip, and a gasket to the pool step after molding and prior to installation. During installation of pool step 10, the faceplate is removed from the pool step 10, the pool liner 102 is installed; a portion of the pool liner 102 is overlapped over a region of the pool step 10 from which the faceplate was previously removed; and the faceplate is then replaced over the portion of the pool liner.

Figure 18:
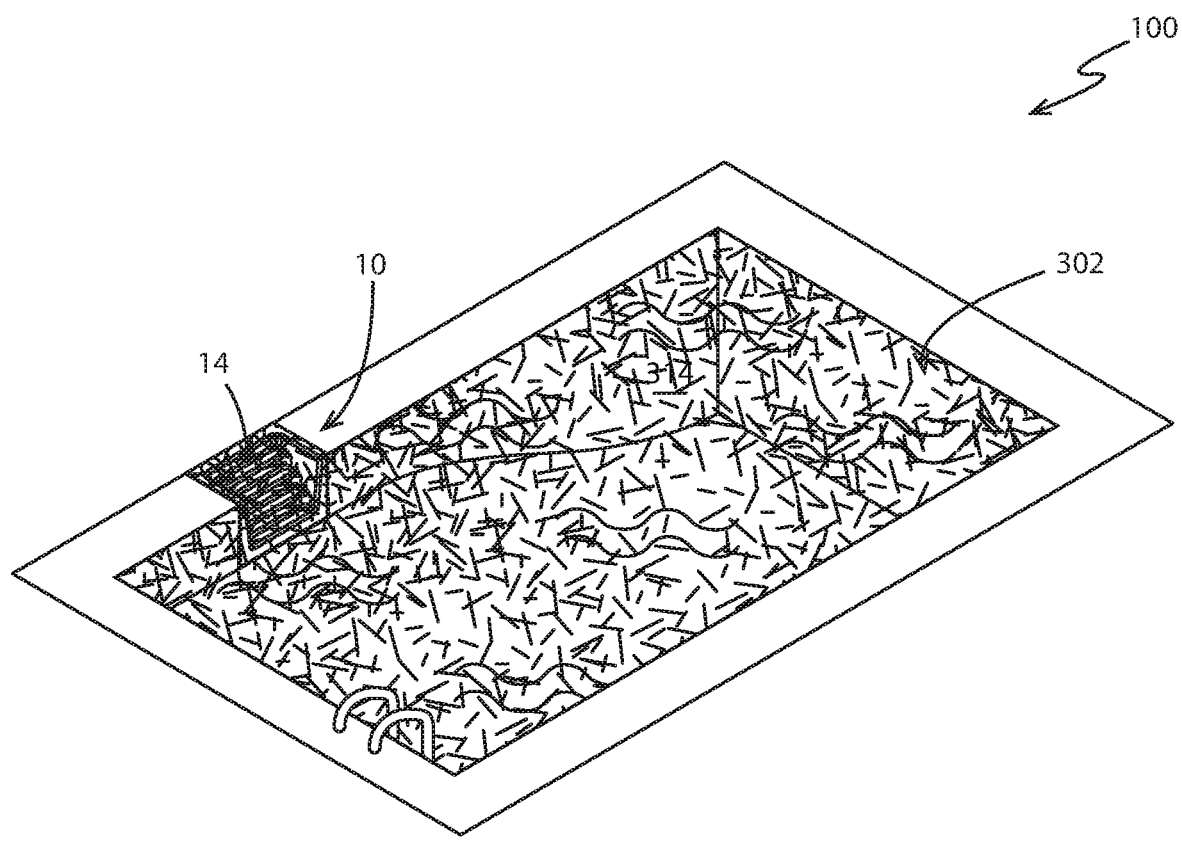
FIG. 18 is a top front perspective view of the installed pool step of FIG. 16 that has a first decorative pattern thereon and showing an instance where the liner in the pool has been changed and the liner includes a different second decorative pattern thereon.
Figure 19:
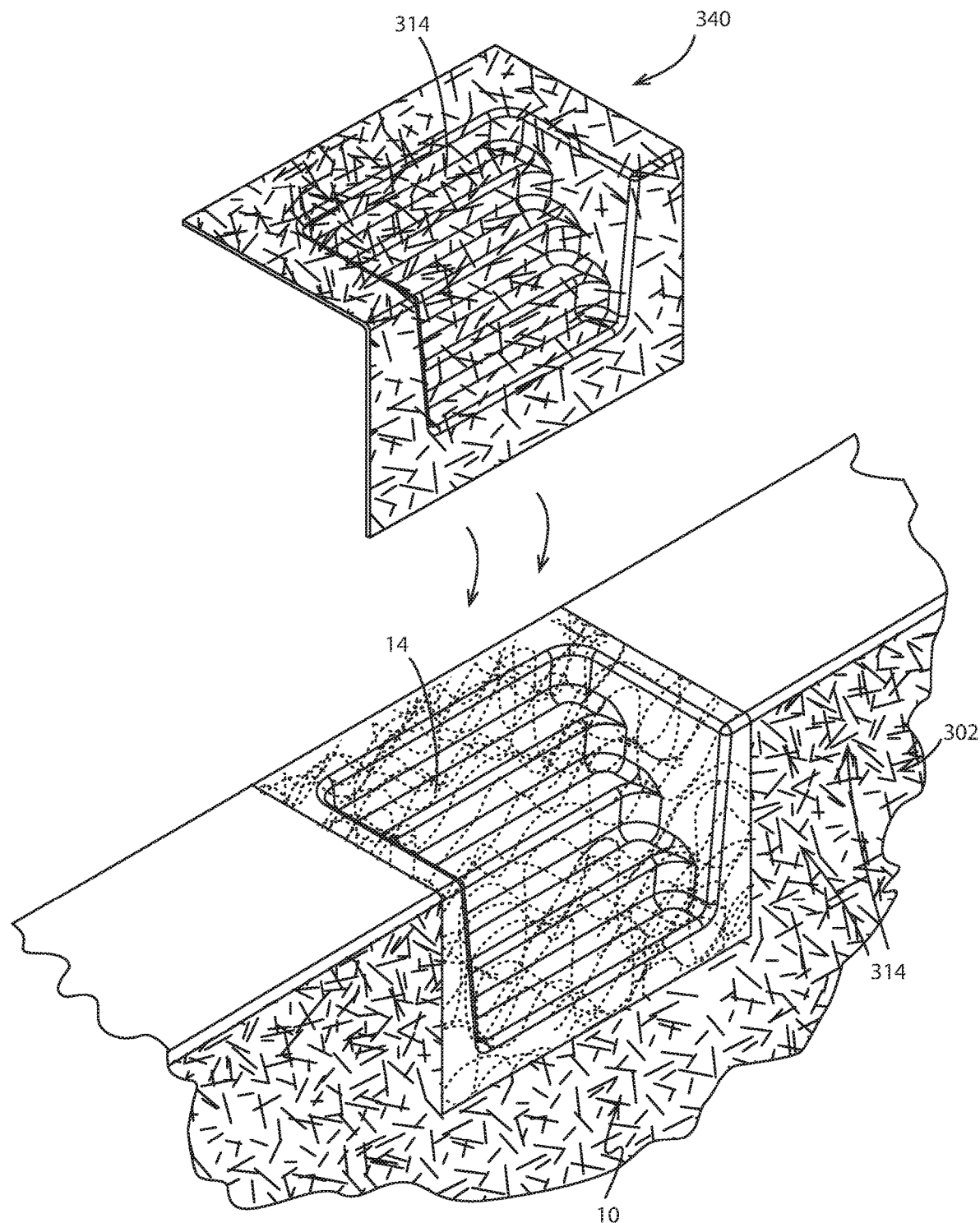
FIG. 19 is an enlarged partial top front perspective view of the installed pool step and a portion of the pool liner shown in FIG. 18 and further showing a pool step cover exploded away from the installed pool step and ready for installation over the originally installed pool step.

As indicated above, FIG. 16 shows a diagrammatic view of swimming pool 100 having pool liner 102 installed on the sidewalls and bottom of the pool and where the liner 102 includes a first decorative pattern 14 thereon. The installed pool step 10 shown in FIG. 16 also includes the same first decorative pattern 14. Sometime after installation of pool liner 102 and pool step 10, e.g. around ten to fifteen years later, the pool owners may decide to remove their pool liner 102 and install a new pool liner 302 that has an updated second decorative pattern 314 thereon. The second decorative pattern 314 is different from the first decorative pattern 14. Obviously, because the pool step 10 had the first decorative pattern 14 applied to an inner surface thereof, the decorative pattern 14 on the installed pool step 10 will now be different from the decorative pattern 314 of the new pool liner 302. FIGS. 18 and 19 illustrate this situation.

Instead of removing the installed pool step 10, a pool step cover 340 in accordance with an aspect of the present disclosure may be installed over the original pool step 10. Pool step cover 340 may be fabricated by molding a sheet of ¼" thick acrylic into a shape and size that is complementary to the shape and size of the already installed pool step 10. In particular, the pool step cover 340 may be produced by following substantially identical method steps 202 to 216 of the method 200 set out in FIG. 17. The pool step cover 340 has the second decorative pattern 314 applied thereto by printing the same on the inner surface of the pool step cover 340 prior to molding.

Although less desirable, it will be understood that in some instances, instead of printing the second decorative pattern 314 on the inner surface of the acrylic sheet to form pool step cover 340, the second decorative pattern 314 may be printed on the outer surface of the acrylic sheet.

Figure 20:
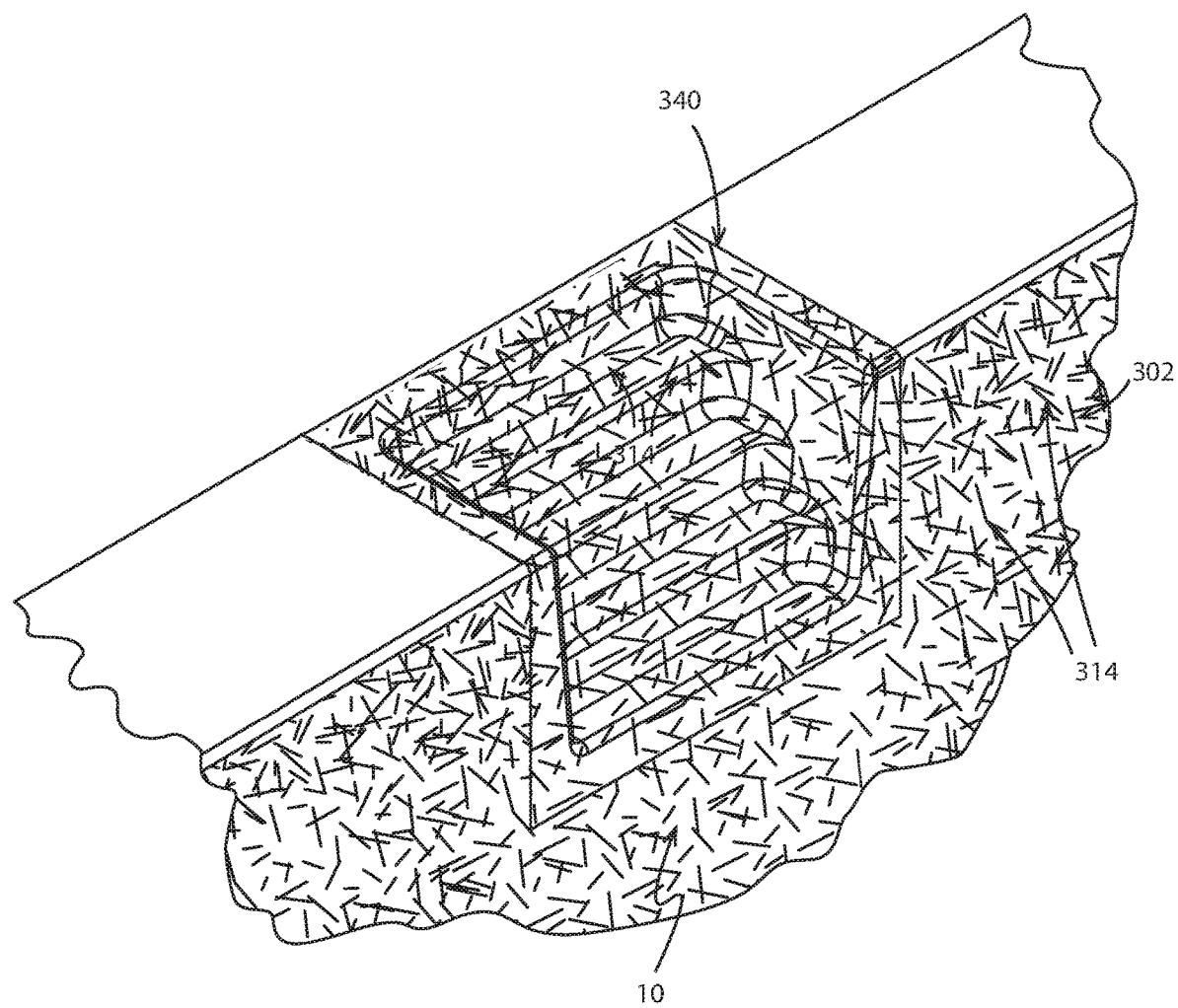
FIG. 20 is an enlarged partial top front perspective view of the pool step of FIG. 19 with the pool step cover installed thereover and showing that the second decorative pattern on the pool step and liner match each other.

Once the pool step cover 340 is ready for installation, the bottom and side faceplates on the installed pool step 10 are removed and the pool step cover 340 is placed over the outer surface of the installed pool step 10. In particular, the pool step cover 340 will be placed so as to cover the top and front of pool step 10. An adhesive is applied along an inner top region of the pool step cover 340 and then the side and bottom faceplates are re-installed to secure pool step cover 340 to pool step 10. FIG. 20 shows the end result, i.e., a pool 100 in which the second decorative pattern 314 on the liner 302 and the second decorative pattern 314 on the pool step cover 340 match each other.

A method of fabricating a pool step cover 340 having a pattern thereon may include applying a second decorative pattern 314 to one surface of a transparent sheet of moldable material; molding the transparent sheet of moldable material into a pool step cover 340; positioning the second decorative pattern 314 a distance inwardly from an outer surface of the pool step cover 340; applying the pool step cover 340 over a pool step 10 having a first decorative pattern 14 or no decorative pattern thereon, and preventing direct contact with the second decorative pattern 314 with a thickness of the transparent sheet of moldable material utilized in fabricating the pool step cover 340. The method may further include applying an adhesive between an interior surface of the pool step cover 340 and an exterior surface of the pool step 10. The method may further include applying bottom and side faceplates previously removed from the pool step 10 to secure the pool step cover 340 to the pool step 10 or to other surrounding regions of the pool 100.

The method of fabricating the pool step cover 340 may further include placing the one surface that includes the second decorative pattern 314 in contact with a molding surface of a pool step mold similar to pool step mold 16 shown in FIG. 6. The application of the second decorative pattern 314 may include printing the second decorative pattern on the inner surface of the transparent sheet of material. The printing of the second decorative pattern 314 may include distortion printing the second decorative pattern 314 onto the inner surface.

The method of fabricating the pool step cover 340 may further include selecting a transparent acrylic material for use as the transparent sheet of moldable material for molding the pool step cover 340. The sheet of moldable material may be heated after printing and before molding a mold-release product may be applied to the molding surface of the pool step mold 16 (or to the sheet of material to be molded) prior to placing the sheet of moldable material on the mold 16. The method may further include stretching the sheet of moldable material over the molding surface 16a, 16c and applying vacuum suction to the stretched sheet of moldable material. The method of fabricating the pool step cover 340 may further include applying a protective material over the second decorative pattern 314 and any portions of the one surface of the pool step cover 340 that are devoid of the second decorative pattern 314. The protective material may be applied in each of a horizontal direction and a vertical direction.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined, Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one; of a number or list of elements, and, optionally; additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment; to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A method of matching a pattern on a pool step with a pattern on a pool liner comprising:
    selecting a decorative pattern for a pool liner from a group of decorative patterns;
    selecting a pool liner for installation into a swimming pool, wherein the pool liner has the decorative pattern thereon;
    selecting a sheet of moldable material having an outside surface and an inside surface; wherein the sheet of moldable material is transparent;
    applying the selected decorative pattern to the inside surface of the sheet of moldable material;
    placing the sheet of moldable material on a pool step mold;
    molding the sheet of moldable material with the pool step mold into a pool step;
    installing the pool step into a swimming pool such that the decorative pattern is spaced a distance inwardly from the outside surface and is visible through the outside surface; and
    installing the pool liner adjacent the pool step.

2. The method of matching as defined in claim 1, wherein the placing of the sheet of moldable material comprising placing the inside surface of the sheet of moldable material that includes the decorative pattern against a molding surface of the pool step mold.

3. The method of matching as defined in claim 2, wherein the placing of the inside surface of the sheet of moldable material is preceded by heating the sheet of moldable material for a predetermined time period at a predetermined temperature.

4. The method of matching as defined in claim 3, wherein the placing of the inside surface of the sheet of moldable material is preceded by spraying the molding surface of the pool step mold with a mold-release product.

5. The method of matching as defined in claim 3, wherein the molding of the sheet of moldable material is preceded by stretching the heated sheet of moldable material over the molding surface.

6. The method of matching as defined in claim 5, further comprising:
    applying vacuum suction to the stretched sheet of moldable material;
    maintaining the vacuum suction for a predetermined period of time; and
    forming a molded sheet having a three-dimensional configuration.

7. The method of matching as defined in claim 1, wherein the selecting of the transparent sheet of moldable material comprises selecting a transparent sheet of acrylic.

8. The method of matching as defined in claim 1, wherein the applying of the decorative pattern comprises printing the decorative pattern on the inside surface of the sheet of moldable material.

9. The method of matching as defined in claim 8, wherein the printing of the decorative pattern includes utilizing distortion printing technology to print the decorative pattern on the inside surface of the sheet of moldable material.

10. The method of matching as defined in claim 1, further comprising:
    applying a layer of protective material over the decorative pattern and any exposed regions of the inside surface of the sheet of moldable material after molding the sheet of moldable material.

11. The method of matching as defined in claim 10, wherein the applying of the layer of protective material includes applying protective material in a horizontal direction and applying protective material in a vertical direction.

12. The method of matching as defined in claim 10, wherein the applying of the layer of protective material comprises spraying protective material over the decorative pattern and the exposed regions of the inside surface of the sheet of moldable material; and allowing the sprayed protective material to dry.

13. The method of matching as defined in claim 10, wherein the applying of the layer of protective material is preceded by orienting the sheet of moldable material straight and level after molding.

14. The method as defined in claim 1, further comprising:
applying one or more of a faceplate, a cover strip, and a gasket to the pool step after molding and prior to installation.

15. The method as defined in claim 14, further comprising:
removing the faceplate from the pool step after installation of the pool step;
installing the pool liner;
overlapping a portion of the pool liner over a region of the pool step from which the faceplate was previously removed; and
replacing the faceplate of the portion of the pool liner.

\* \* \* \* \*